(12) United States Patent
Stallings et al.

(10) Patent No.: US 9,301,012 B2
(45) Date of Patent: Mar. 29, 2016

(54) SYSTEMS, METHODS, AND APPARATUSES FOR RESOLVING MEDIA CONTENT RECORDING CONFLICTS

(71) Applicant: Verizon Patent and Licensing Inc., Arlington, VA (US)

(72) Inventors: Heath Stallings, Colleyville, TX (US); Venkata S. Adimatyam, Irving, TX (US); Brian F. Roberts, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/709,243

(22) Filed: May 11, 2015

(65) Prior Publication Data
US 2015/0245100 A1    Aug. 27, 2015

Related U.S. Application Data

(63) Continuation of application No. 12/347,704, filed on Dec. 31, 2008, now Pat. No. 9,032,444.

(51) Int. Cl.
| | |
|---|---|
| *H04N 21/472* | (2011.01) |
| *H04N 21/458* | (2011.01) |
| *H04N 21/433* | (2011.01) |
| *H04N 21/436* | (2011.01) |
| *H04N 21/443* | (2011.01) |
| *H04N 21/262* | (2011.01) |

(52) U.S. Cl.
CPC ... *H04N 21/47214* (2013.01); *H04N 21/26241* (2013.01); *H04N 21/4331* (2013.01); *H04N 21/4334* (2013.01); *H04N 21/43622* (2013.01); *H04N 21/443* (2013.01); *H04N 21/4583* (2013.01)

(58) Field of Classification Search
CPC .......................... H04N 21/45; H04N 21/4583
USPC ..................................................... 725/58–61
See application file for complete search history.

(56) References Cited

U.S. PATENT DOCUMENTS

| | | | |
|---|---|---|---|
| 2002/0073427 A1 | 6/2002 | Morrison et al. | |
| 2002/0191954 A1* | 12/2002 | Beach et al. | 386/46 |
| 2003/0072559 A1 | 4/2003 | Van Haver | |
| 2003/0198462 A1 | 10/2003 | Bumgardner et al. | |
| 2004/0103434 A1 | 5/2004 | Ellis | |

(Continued)

FOREIGN PATENT DOCUMENTS

| | | |
|---|---|---|
| EP | 1339229 | 8/2003 |
| EP | 1580995 | 9/2005 |

OTHER PUBLICATIONS

"Replay TV 5500 User's Guide", Aug. 1, 2003, Digital Networks North America, Inc., p. 42.

*Primary Examiner* — Nicholas Corbo

(57) ABSTRACT

An exemplary method includes detecting, on a media content recording device, a media content recording conflict between a plurality of scheduled recordings of media content instances, and outputting, for display on a display device, data representative of a graphical user interface including a plurality of graphical objects representative of the plurality of scheduled recordings of the media content instances and at least one option configured to facilitate resolution of the media content recording conflict. Corresponding methods, systems, apparatuses, and computer-readable media are also described.

21 Claims, 21 Drawing Sheets

(56) References Cited

U.S. PATENT DOCUMENTS

| | | |
|---|---|---|
| 2006/0037047 A1* | 2/2006 | DeYonker et al. .............. 725/58 |
| 2006/0037048 A1 | 2/2006 | DeYonker et al. |
| 2006/0051058 A1 | 3/2006 | Rudolph et al. |
| 2008/0276284 A1* | 11/2008 | Bumgardner et al. .......... 725/58 |
| 2009/0119715 A1 | 5/2009 | Schwesinger et al. |

* cited by examiner

US 9,301,012 B2

SYSTEMS, METHODS, AND APPARATUSES FOR RESOLVING MEDIA CONTENT RECORDING CONFLICTS

RELATED APPLICATIONS

This application is a continuation application of U.S. patent application Ser. No. 12/347,704, filed Dec. 31, 2008, and entitled SYSTEMS, METHODS, AND APPARATUSES FOR RESOLVING MEDIA CONTENT RECORDING CONFLICTS, which is hereby incorporated by reference in its entirety.

BACKGROUND INFORMATION

The set-top box ("STB") has become an important device for accessing media content services and the media content within those services. It is not uncommon for an STB to include or to be used in conjunction with digital video recording ("DVR") technology, which may be used to record media content to permanent storage (e.g., a hard disk) for subsequent local access.

A common problem experienced by users of traditional DVR technology is that of recording conflicts. For example, a DVR device typically has limited resources for recording media content. Consequently, the DVR device can record only a limited number of media programs at one time. If a number of media programs scheduled for concurrent recording exceeds the recording resources of the DVR device, a recording conflict results. Typically, a recording conflict causes at least one of the conflicting media programs scheduled for recording to not be recorded.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION OF PREFERRED EMBODIMENTS

Exemplary systems, methods, and apparatuses for facilitating resolution of media content recording conflicts are disclosed herein. As described in more detail below, in certain examples, a media content recording conflict between scheduled recordings of media content instances may be detected and data representative of a graphical user interface including a media content recording conflict resolution view may be generated and output for display on a display device. The graphical user interface may include at least one option configured to facilitate resolution of the media content recording conflict. As an example, an exemplary method includes detecting, on a media content recording device, a media content recording conflict between a plurality of scheduled recordings of media content instances, and outputting, for display on a display device, data representative of a graphical user interface including a plurality of graphical objects representative of the plurality of scheduled recordings of the media content instances and at least one option configured to facilitate resolution of the media content recording conflict. Exemplary options configured to facilitate resolution of the media content recording conflict are disclosed herein.

The term "media content instance" as used herein may refer generally to any television program or episode, on-demand media program, pay-per-view media program, broadcast media program (e.g., broadcast television program), IPTV content, commercial, advertisement, video, movie, song, video game, image, photograph, sound, or any segment, component, or combination of these or other forms of media content that may be viewed or otherwise experienced by a user. In certain embodiments, a media content instance includes a television program that is configured to be transmitted (e.g., broadcast, multicast, or narrowcast) to at least one media content processing device during a scheduled transmission time period.

Components and functions of exemplary systems, methods, and apparatuses for facilitating resolution of media content recording conflicts will now be described in more detail.

Figure 1:
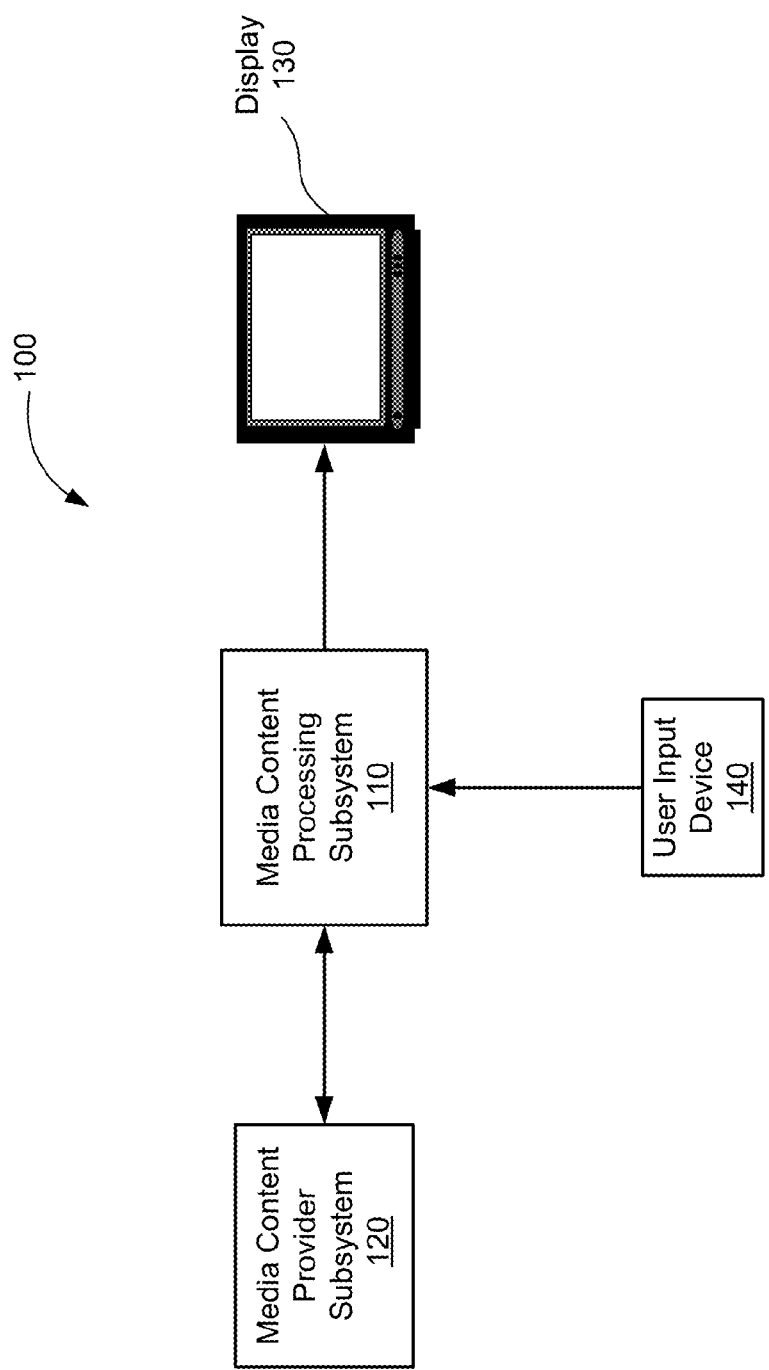
FIG. 1 illustrates an example of a media content access system.

FIG. 1 illustrates an exemplary media content access system 100 (or simply "system 100"). System 100 may include a media content processing subsystem 110, media content provider subsystem 120, display device 130, and user input device 140 communicatively coupled to one another as shown in FIG. 1. Media content processing subsystem 110 may be configured to communicate with and receive a signal and/or data stream containing data representative of media content and/or program guide data from media content provider subsystem 120. Media content processing subsystem 110 and media content provider subsystem 120 may communicate using any suitable communication technologies, devices, networks, media, and protocols supportive of remote data communications.

Figure 2:
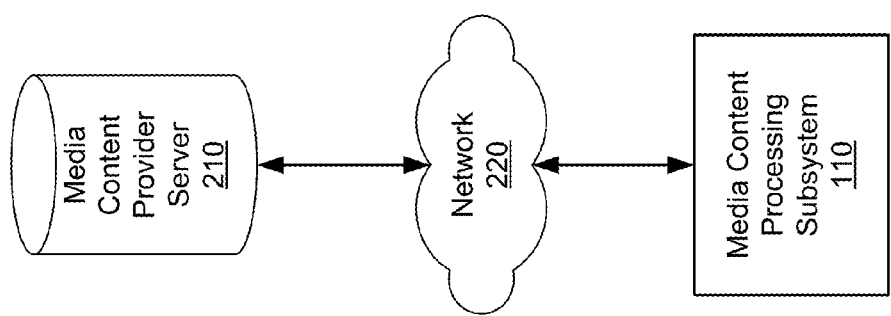
FIG. 2 illustrates an exemplary media content provider network.

For example, as shown in FIG. 2, media content provider subsystem 120 may include or be implemented on at least one media content provider server 210 configured to communicate with media content processing subsystem 110 over a network 220 (and communications links thereto). Network 220 may include one or more networks or types of networks capable of carrying communications and/or data signals between media content provider server 210 and media content processing subsystem 110. For example, network 220 may include, but is not limited to, a cable network, optical fiber network, hybrid fiber coax network, wireless network (e.g., a Wi-Fi and/or mobile telephone network), satellite network, wireless broadcast network (e.g., a satellite media broadcasting network or terrestrial broadcasting network), subscriber television network, a provider-specific network (e.g., a Verizon® FIOS® network), the Internet, an intranet, local area network, any other suitable network, and any combination or sub-combination of these networks.

Media content processing subsystem 110 and media content provider server 210 may communicate over network 220 using any suitable communication technologies, devices, media, and protocols supportive of remote data communications, including, but not limited to, data transmission media, communications devices, Transmission Control Protocol ("TCP"), Internet Protocol ("IP"), File Transfer Protocol ("FTP"), Telnet, Hypertext Transfer Protocol ("HTTP"), Real Time Protocol ("RTP"), User Datagram Protocol ("UDP"), Ethernet, and any other suitable communications technologies, devices, media, and protocols.

Returning to FIG. 1, media content processing subsystem 110 may be configured to process a media content stream received from media content provider subsystem 120. The processing may include causing media content included in the stream to be presented for experiencing (e.g., viewing) by a user. Presentation of the media content may include, but is not limited to, displaying, playing back, or otherwise presenting the media content, or one or more components of the media content, such that the media content may be experienced by the user. For example, media content processing subsystem 110 may provide one or more signals to display device 130 (e.g., a television screen, computer monitor, etc.) such that the display device 130 may present media content for experiencing by the user.

As shown in FIG. 1, and as will be described in more detail below, media content processing subsystem 110 may be at least partially controlled by user input device 140 (e.g., a remote control device). In certain examples, user input device 140 may include one or more input mechanisms by which a user may utilize and/or control features and/or services provided by media content processing subsystem 110.

Figure 3:
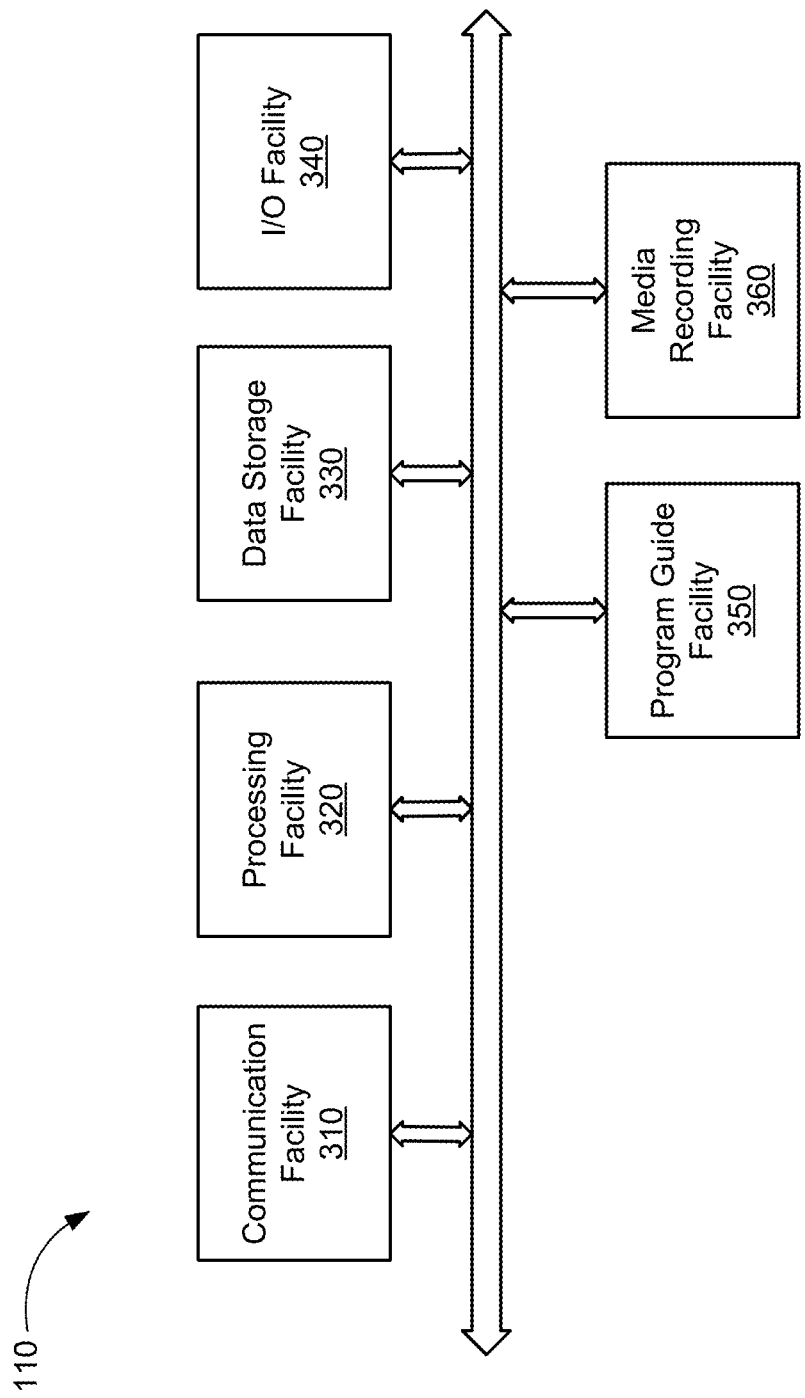
FIG. 3 illustrates an exemplary media content processing subsystem.

Exemplary components, features, operations, and implementations associated with media content processing subsystem 110 will now be described. FIG. 3 illustrates exemplary components of media content processing subsystem 110 (or simply "processing subsystem 110"). As shown in FIG. 3, processing subsystem 110 may include a communication facility 310, processing facility 320, data storage facility 330, input/output ("I/O") facility 340, program guide facility 350, and media recording facility 360. The components of system 100 may communicate with one another, including sending data to and receiving data from one another, using any suitable communication technologies.

As described further below, media content processing subsystem 110 may be configured to record media content to permanent storage for subsequent access (e.g., subsequent playback). Accordingly, media content processing subsystem 110 may be referred to as "media content recording subsystem 110."

In certain embodiments, processing subsystem 110 or one or more components of processing subsystem 110 may include any computer hardware and/or computer-implemented instructions (e.g., software), or combinations of computer-implemented instructions and hardware, configured to perform one or more of the processes described herein. In particular, it should be understood that processing subsystem 110 may be implemented on one physical computing device or may be implemented on more than one physical computing device. Accordingly, processing subsystem 110 may include any one of a number of computing devices, and may employ any of a number of computer operating systems.

Accordingly, one or more of the processes described herein may be implemented at least in part as instructions executable by one or more computing devices. In general, a processor (e.g., a microprocessor) receives instructions, from a computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary processing subsystem 110 is shown in FIG. 3, the components illustrated in FIG. 3 are not intended to be limiting. Additional or alternative components may be used in other embodiments. Components of the processing subsystem 110 shown in FIG. 3 will now be described in additional detail.

Communication facility 310 may be configured to communicate with one or more external devices, including one or more external sources of media content. In particular, communication facility 310 may be configured to communicate with media content provider subsystem 120, including sending and/or receiving communications signals, content, and/or data to/from media content provider subsystem 120. For example, communication facility 310 may be configured to receive transmitted data representative of media content in any acceptable format from media content provider subsystem 120. The media content may include one or more media content instances.

Typically, media content provider subsystem 120 may transmit (e.g., broadcast, multicast, or narrowcast) one or more data streams containing data representative of one or more media content instances. Communication facility 310 may receive such data streams such that the data representative of the media content instances contained therein may be processed by processing subsystem 110. To this end, communication facility 310 may include any device, logic, and/or other technologies suitable for receiving signals, data streams, and/or data representative of media content. Communication facility 310 may be configured to interface with any suitable communication media, protocols, and formats, including any of those mentioned above.

In certain embodiments, media content provider subsystem 120 may be configured to transmit and processing subsystem 110 may be configured to receive data streams or signals including data representative of various media content instances in accordance with a transmission schedule. The transmission schedule may specify that particular media content instances are to be transmitted at scheduled transmission times and on certain content carrier channels. As used herein, the term "scheduled transmission time" or "scheduled transmission" may refer generally to any period of time during which a media content instance is to be transmitted to processing subsystem 110. The term "content carrier channel" or "content channel" as used herein may refer generally to any carrier of media content, including, but not limited to, media (e.g., television) channels, streams, addresses, frequencies or other carriers of media content.

Communication facility 310 may be configured to selectively identify, receive, and/or process appropriate data streams and/or media content instances at the scheduled transmission times and on the appropriate content carrier channels. For instance, in certain implementations communication facility 310 may include a tuner configured to selectively receive media content carried on a particular content carrier channel. The tuner may be tuned to a particular content carrier channel such that the content carried on the content carrier channel is received and may be processed by processing subsystem 110.

In some examples, communication facility 310 may include multiple tuners (e.g., two tuners) such that content carried on different content carrier channels may be concurrently received for processing by the processing subsystem 110. For example, communication facility 310 may include a first tuner configured to receive content carried on an analog video signal and a second tuner configured to concurrently receive content carried on a digital compressed signal.

While one or more tuners may be used to receive various types of content-carrying signals transmitted by media content provider subsystem 120, additionally or alternatively, communication facility 310 may be configured to receive other types of signals (e.g., other types of media content carrying signals) from media content provider subsystem 120 and/or one or more other sources without using a tuner. For example, media content provider subsystem 120 may transmit digital streams of data packets (e.g., Internet Protocol ("IP") based data packets) that can be received without using a tuner. For such types of signals, communication facility 310 may receive and forward the signals directly to other components of processing subsystem 110 (e.g., processing facility 320) without the signals going through a tuner. For an IP-based signal, for example, communication facility 310 may function as an IP receiver.

Processing facility 320 may include one or more processors and may be configured to execute and/or direct execution of one or more of the processes or operations described herein. Processing facility 320 may direct execution of operations in accordance with computer-executable instructions such as may be stored in data storage facility 330 or another computer-readable medium. As an example, processing facility 320 may be configured to process data, including demodulating, decoding, and parsing acquired data (e.g., data representative of media content received from media content provider subsystem 120 by communication facility 310), and encoding and modulating data for transmission by communication facility 310.

Data storage facility 330 may include one or more data storage media, devices, or configurations and may employ any type, form, and combination of data storage media and/or device. For example, data storage facility 330 may include, but is not limited to, a hard drive, network drive, flash drive, magnetic disc, optical disc, random access memory ("RAM"), dynamic RAM ("DRAM"), other non-volatile and/or volatile data storage units, or a combination or subcombination thereof. Electronic data, including data described herein (e.g., media content data, program guide data, and recording scheduled data), may be temporarily and/or permanently stored in data storage facility 330.

I/O facility 340 may be configured to receive user input and provide user output and may include any hardware, firmware, software, or combination thereof supportive of input and output capabilities. For example, I/O facility 340 may include one or more devices for capturing user input, including, but not limited to, a microphone, speech recognition technologies, keyboard or keypad, touch screen component (e.g., touch screen display), receiver (e.g., an RF or infrared receiver), and one or more input buttons.

I/O facility 340 may include one or more devices for presenting output to a user, including, but not limited to, a graphics engine, a display device (e.g., a display screen), one or more output drivers (e.g., display drivers), one or more audio speakers, and one or more audio drivers. In certain embodiments, I/O facility 340 is configured to output graphical data to display device 130 for presentation to a user. Exemplary graphical user interfaces ("GUIs") and GUI views that may be output to and displayed by display device 130 are described further below.

Program guide facility 350 may be configured to maintain and operate on program guide data. As mentioned above, media content instances may be transmitted by media content provider subsystem 120 at scheduled transmission times and on certain content carrier channels. To assist processing subsystem 110 and/or a user of processing subsystem 110 with reception of media content instances at appropriate scheduled transmission times and on appropriate content carrier channels, program guide data may be received by communication facility 310 from media content provider subsystem 120 and/or from another source. The program guide data may be stored in data storage facility 330.

The program guide data may include information descriptive of a media content transmission schedule, including information descriptive of content carrier channels, scheduled transmission times (e.g., programming time slots), media content instances, metadata for the media content instances, and relationships between the content channels, transmission times, and media content instances. In certain embodiments, the program guide data received and stored by processing subsystem 110 is descriptive of a media content transmission schedule covering a certain period of time (e.g., a twenty-four hour period, a week, two weeks, or a month). Accordingly, processing subsystem 110 may be configured to periodically receive at least one update to the program guide data (i.e., updated program guide data) that is descriptive of a transmission schedule for a new period of time. For example, processing subsystem 110 may be configured to receive updated program guide data on a daily basis (e.g., at a certain off-peak time each night).

Program guide facility 350 may be configured to arrange and provide graphical data representative of a program guide view to I/O facility 340 for inclusion in a GUI. I/O facility 340 may generate and output data representative of a GUI including the program guide view to display device 130 for presentation to a user. A program guide view may include a graphical arrangement of program guide data, one or more program guide tools (e.g., program guide navigation, search, and/or filter tools), one or more graphical selectors for navigating and highlighting selectable options, and/or other graphics. Typically, a program guide view presents at least a portion of a media content transmission schedule to a user. The user may utilize the program guide view to access information about media content instances and scheduled transmission times and channels associated with the media content instances.

Media recording facility 360 may be configured to record data representative of media content to data storage facility 330. The recording of a media content instance is typically performed during a transmission time slot when data representative of the media content instance is received from media content provider subsystem 120 as described above. For example, during transmission of a media content instance from media content provider subsystem 120 to processing device 110 on a content carrier channel, communication facility 310 may receive data representative of the media content instance on the content carrier channel, and media recording facility 360 may direct that the received data representative of the media content instance be stored to data storage facility 330. Once stored, the data representative the media content instance may be accessed and processed as may suit a particular application, including providing data representative of the media content instance to display device 130 for presentation to a user.

Media recording facility 360 may be configured to schedule recordings of data representative of media content instances. Typically, media recording facility 360 is configured to schedule recordings based on a media content transmission schedule, which may be represented by program guide data. As an example, media recording facility 360 may schedule a recording of a media content instance. When a scheduled transmission time for the media content instance arrives, media recording facility 360 may initiate a recording of the media content instance on an appropriate content carrier channel associated with the scheduled transmission of the media content instance.

Media recording facility 360 may be configured to maintain a schedule of one or more recordings, which schedule may be referred to as a "recording schedule." Data representative of the recording schedule may be referred to as "recording schedule data." The recording schedule, or entries included in the recording schedule, may be created in response to user input (e.g., a user selecting a media content instance to be recorded) or automatically by media recording facility 360 in response to a predetermined event. These and additional features of media recording facility 360 are described in additional detail further below.

Figure 4:
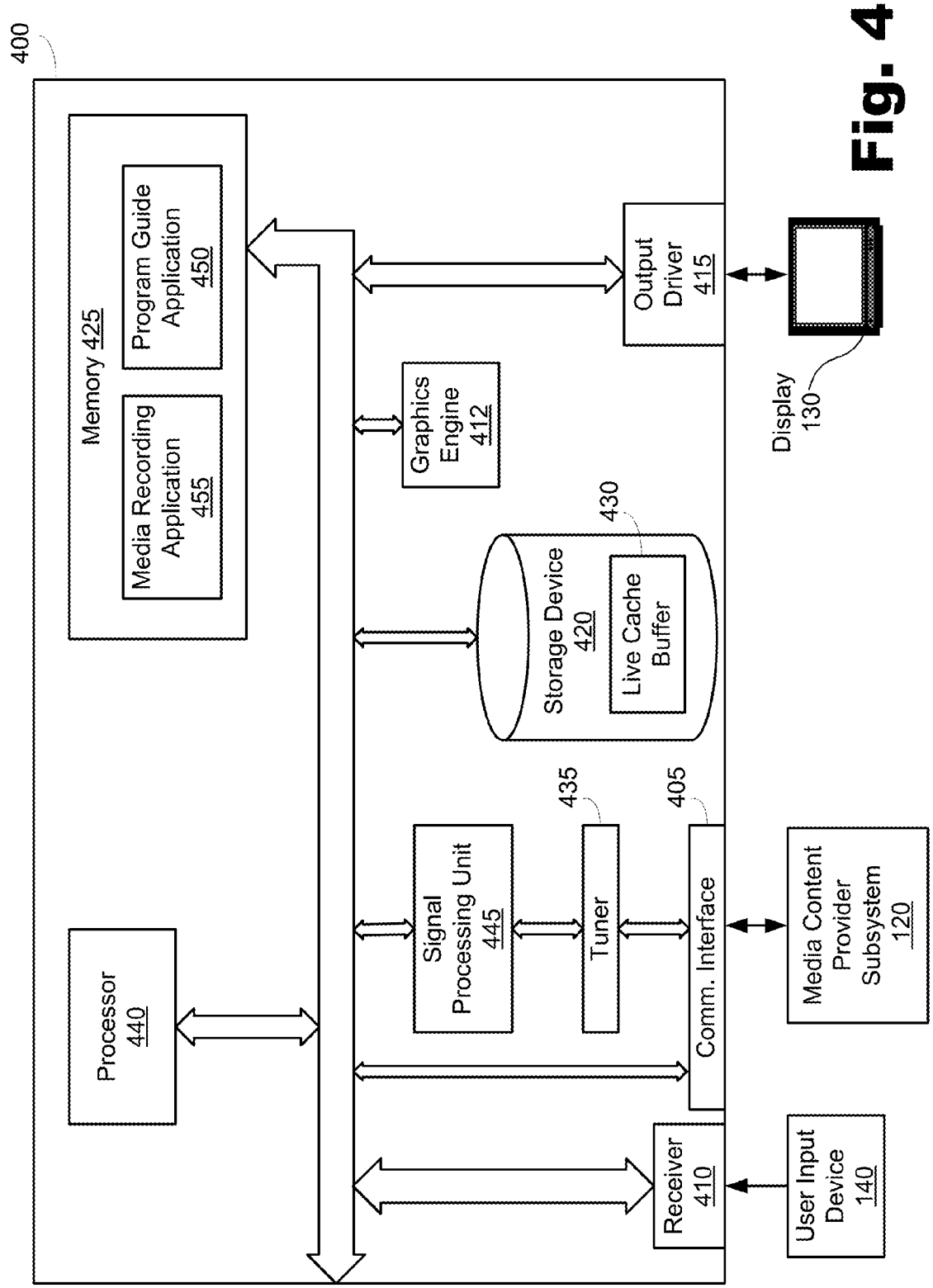
FIG. 4 illustrates an exemplary device implementation of the media content processing subsystem of FIG. 3.

Processing subsystem 110 and/or components of processing subsystem 110 may be implemented as may suit a particular application. FIG. 4 illustrates an exemplary device 400 having processing subsystem 110 implemented thereon. Device 400 may include one or more of the components of processing subsystem 110 shown in FIG. 3 and may be configured to perform one or more of the processes and/or operations described herein. Device 400 may include, but is not limited to, a media content processing device, communications device, mobile device (e.g., a mobile phone device), handheld device, personal computer, phone device (e.g., Verizon Hub device), personal-digital assistant device, set-top box, gaming device, digital video recording ("DVR") device (e.g., a personal video recording ("PVR") device), a television device, and/or any device configured to perform one or more of the processes and/or operations described herein. As described herein, device 400 may be configured to record media content to permanent storage for subsequent access. Accordingly, device 400 may be referred to as "media content recording device 400."

As shown in FIG. 4, device 400 may include a communication interface 405 configured to receive content (e.g., media content) and/or data (e.g., program guide data) in any acceptable format from media content provider subsystem 120 or from any other suitable external source. Communication interface 405 may include any device, logic, and/or other technologies suitable for receiving signals and/or data representative of media content and/or other types of content or data. Communication interface 405 may be configured to interface with any suitable communication media, protocols, and formats, including any of those mentioned above.

Device 400 may also include a receiver 410 configured to receive user input signals from user input device 140. User input device 140 may include, for example, a remote control device or any other suitable input device and may be configured to communicate with receiver 410 via a wireless link, electrical connection, or any other suitable communication link.

Figure 5:
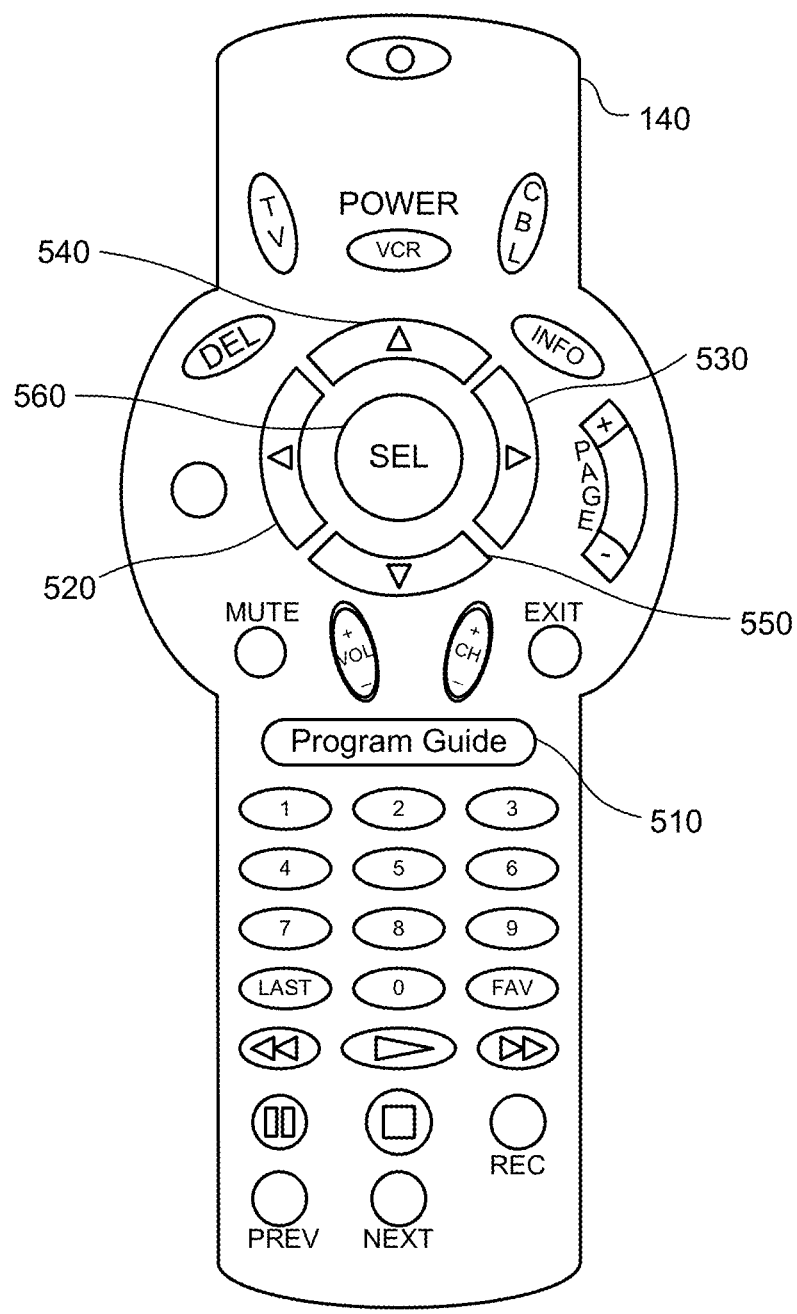
FIG. 5 illustrates an exemplary remote control user input device.

An exemplary remote control user input device 140 is illustrated in FIG. 5. In some examples, input device 140 may be configured to facilitate a user controlling operations of processing subsystem 110, including controlling options for experiencing media content, viewing program guide data, scheduling recordings of media content, and resolving media content recording conflicts. For instance, a program guide button 510 may be configured to evoke a presentation of a program guide GUI on display 130. A left button 520, right button 530, up button 540, down button 550, and select button 560 may be included and configured to facilitate a user evoking and/or navigating through various views, options, and GUIs displayed by display device 130. Input device 140 shown in FIG. 5 is merely illustrative of one of the many different types of user input devices that may be used to provide input commands to processing subsystem 110.

Returning to FIG. 4, device 400 may include a graphics engine 412 and an output driver 415. Graphics engine 412 may be configured to generate graphics to be provided to output driver 415, which may be configured to interface with or drive display device 130. Output driver 415 may provide output signals to display device 130, the output signals including graphical content (e.g., media content and/or program guide content) generated by graphics engine 412 and to be presented by display device 130 for experiencing by a user. For example, output driver 415 may output data representative of a GUI including a program guide view to display device 130 for presentation to the user. Exemplary GUIs that may be output for display on display device 130 are described further below. Graphics engine 412 and output driver 415 may include any combination of hardware, software, and/or firmware as may serve a particular application.

Storage device 420 may include one or more data storage media, devices, or configurations and may employ any type, form, and combination of storage media. For example, storage device 420 may include, but is not limited to, a hard drive, network drive, flash drive, magnetic disc, optical disc, or other non-volatile storage unit. Media content, program guide data, recording schedule data, and other data may be temporarily and/or permanently stored in storage device 420.

Storage device 420 is shown to be a part of the device 400 in FIG. 4 for illustrative purposes only. It will be understood that storage device 420 may additionally or alternatively be located external of device 400.

Storage device 420 may include one or more live cache buffers 430. Live cache buffer 430 may additionally or alternatively reside in memory 425 or in a storage device external to device 400. In some examples, media content data may be temporarily stored in live cache buffer 430 to facilitate viewing and/or recording of the media content.

Device 400 may include memory 425. Memory 425 may include, but is not limited to, FLASH memory, random access memory ("RAM"), dynamic RAM ("DRAM"), other suitable computer-readable media, or any combination or subcombination thereof. In some examples, one or more applications configured to run on device 400 may reside in memory 425.

Device 400 may include one or more tuners 435. As described above, tuner 435 may be configured to selectively receive media content carried on a particular content carrier channel such that the media content may be processed by device 400. In some examples, media content received by tuner 435 may be temporarily buffered, or stored, in the live cache buffer 430. If there are multiple tuners 435, there may be a live cache buffer 430 corresponding to each of the tuners 435.

While tuner 435 may be used to receive certain content-carrying signals transmitted by media content provider subsystem 120, device 400 may be configured to receive other types of content signals (including media content signals and/or program guide data signals) from media content provider subsystem 120 and/or one or more other sources without using a tuner. For example, media content provider subsystem 120 may transmit digital streams of data packets (e.g., Internet Protocol ("IP") based data packets) that can be received without using a tuner. For such types of content signals, communication interface 405 may receive and forward the signals directly to other components of device 400 (e.g., processor 440 or signal processing unit 445) without the signals going through tuner 435. For an IP-based signal, for example, signal processing unit 445 may function as an IP receiver.

Device 400 may include at least one processor, such as processor 440, configured to control and/or perform one or more operations of device 400. Device 400 may also include a signal processing unit 445 configured to process incoming media content. Signal processing unit 445 may be configured, for example, to demodulate and parse encoded digital media content. In some examples, device 400 may include one or more signal processing units 445 corresponding to each of the tuners 435.

Device 400 may include one or more applications (e.g., software applications) residing in memory 425 or another computer-readable medium and configured to be executed by processor 440 of device 400. In FIG. 4, device 400 includes a program guide application 450 and a media recording application 455 residing in memory 425. Program guide application 450 may be configured to perform or direct one or more other components of device 400 to perform one or more of the program guide operations described herein. Media recording application 455 may be configured to perform or direct one or more other components of device 400 to perform one or more of the media recording related operations described herein. In certain embodiments, program guide facility 350 may be implemented in device 400 as program guide application 450, and media recording facility 360 may be implemented in device 400 as media recording application 455.

As mentioned above, media recording facility 360 may be configured to maintain a schedule of media content recordings. The recording schedule may include data representative of one or more media content instances or series of media content instances scheduled for recording, one or more time slots during which the media content instances are scheduled to be recorded, and one or more content carrier channels on which the media content instances are scheduled to be received for recording.

In certain examples, a media content recording conflict may exist in a recording schedule. As used herein, a media content recording conflict may include any conflict between scheduled recordings of media content instances that may cause at least one of the scheduled recordings to not be performed. For example, multiple media content instances may be scheduled for recording during common or overlapping times. However, resources for recording media content are typically finite on a media content recording subsystem or device. For example, processing subsystem 110 may have resources that are sufficient to record only a certain maximum number of media content instances at one time. Where resources of processing subsystem 110 are insufficient to support concurrent recording of the media content instances scheduled for recording during common or overlapping times, a recording conflict exists and at least a portion of one or more of the scheduled recordings may not be recorded as scheduled.

As an example, processing subsystem 110 may be limited to concurrently record only the number of media content instances for which tuners 435 are available to receive data representative of the media content instances from media provider subsystem 120. Where processing subsystem 110 includes only a single tuner 435, a single media content instance may be recorded at one time. Where processing subsystem 110 includes two tuners 435, two media content instances may be recorded concurrently. Tuners 435 are merely one example of resources that may limit the number of concurrent recordings of media content. Other resources, such as transmission bandwidth, processing resources (e.g., signal processing resources), and memory resources, may similarly limit the number of media content instances that can be concurrently recorded.

When a recording conflict exists, the scheduled recordings causing the conflict may be prioritized to determine which of the scheduled recordings will be performed as scheduled. Media recording facility 360 may be configured to prioritize conflicting recordings based on a predefined prioritization heuristic. The prioritization heuristic may be defined as may suit a particular implementation. In certain embodiments, media recording facility 360 may provide at least one tool configured to facilitate a user of processing subsystem 110 customizing one or more settings of the prioritization heuristic.

In certain embodiments, the prioritization heuristic may be configured to prioritize earlier scheduled recordings over later scheduled recordings. For example, if recordings of first, second, and third media content instances were scheduled in that order and processing subsystem 110 included resources for concurrently recording no more than two media content instances, media recording facility 360 may choose not to record the third media content instance as scheduled based on the prioritization heuristic. In other words, the conflicting scheduled recording of the third media content instance is "bumped," meaning that the scheduled recording will not be performed as scheduled.

Media recording facility 360 may be configured to detect a media content recording conflict between scheduled recordings of media content instances. The detection of a media content recording conflict may be accomplished in any suitable way. In certain embodiments, for example, media recording facility 360 may identify, based on recording schedule data, when sufficient resources will not be available to perform a scheduled media content recording. Media recording facility 360 may further identify, based on the recording schedule data, the scheduled recordings causing the conflict to exist. As an example, where processing subsystem 110 and/or device 400 is configured to concurrently record no more than two media content instances, but three media content instances are scheduled for concurrent or overlapping recording, media recording facility 360 may detect the conflict and identify the scheduled recordings of the three media content instances causing the conflict.

In response to a detection of a media content recording conflict, media recording facility 360 may provide at least one option configured to facilitate resolution of the conflict. For example, media recording facility 360 may direct processing subsystem 110 and/or device 400 to generate and output data representative of a GUI for display on display device 130. The GUI may include information about the detected media content recording conflict and at least one option configured to facilitate resolution of the conflict.

FIGS. 6-20 illustrate exemplary GUIs having exemplary media recording conflict resolution views displayed therein. The GUIs shown in FIGS. 6-20 are merely illustrative of the many different GUIs that may be used to facilitate resolution of one or more media recording conflicts in accordance with the systems, methods, and apparatuses described herein.

Figure 6:
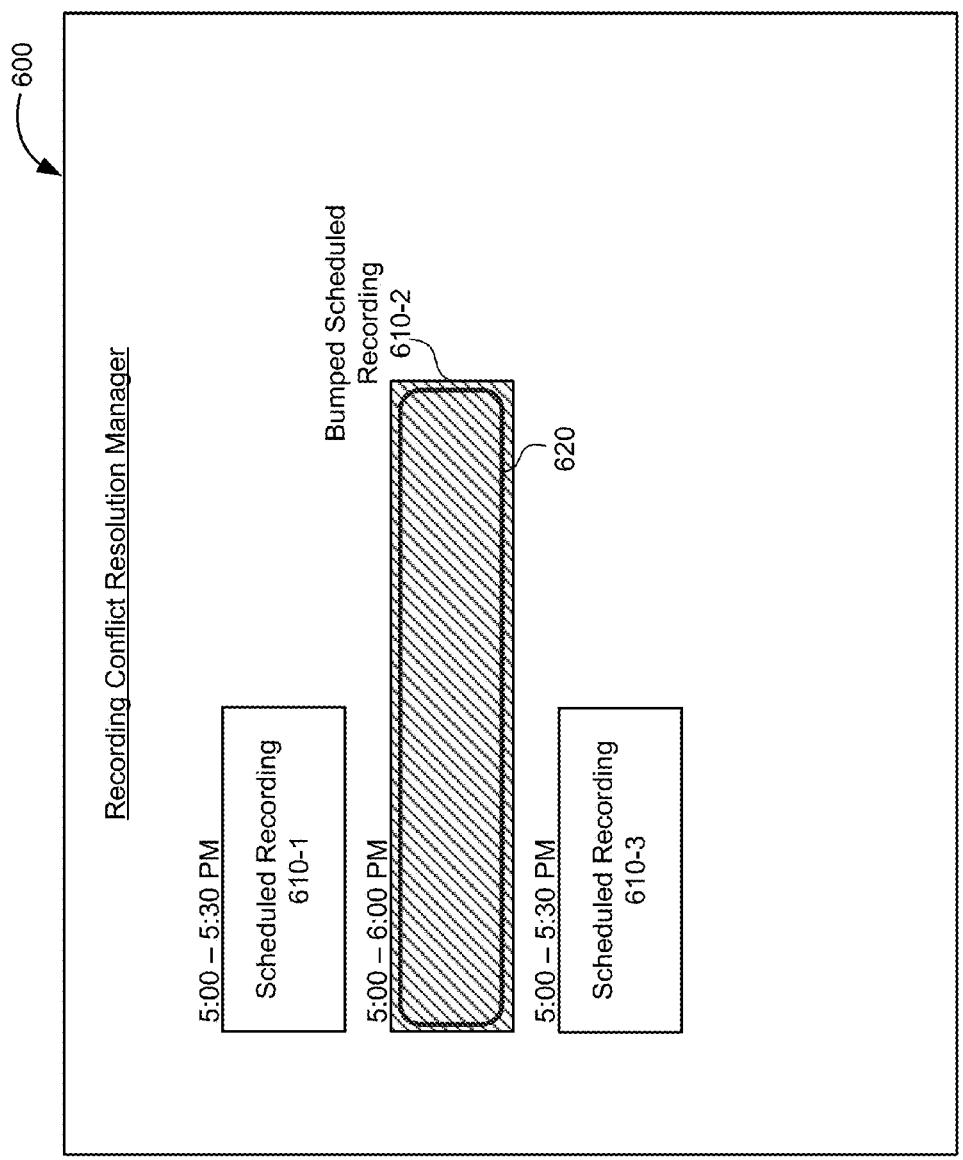
FIGS. 6-20 illustrate exemplary graphical user interfaces ("GUIs") having exemplary media recording conflict resolution views displayed therein.

FIG. 6 illustrates a media content recording conflict resolution GUI 600 configured to facilitate resolution of one or more media recording conflicts. GUI 600 may include a plurality of graphical objects representative of a plurality of scheduled recordings of media content instances. In FIG. 6, the scheduled recordings include recordings 610-1 through 610-3, which may be collectively referred to as "scheduled recordings 610."

The graphical objects representative of scheduled recordings 610 may be positioned in rows each having corresponding time indicators so as to visually indicate time slots during which scheduled recordings 610 are to be performed. For example, scheduled recordings 610-1 and 610-3 are scheduled to be performed during a time slot of 5:00 PM-5:30 PM, while scheduled recording 610-2 is scheduled to be performed during a time slot of 5:00 PM-6:00 PM.

GUI 600 is further configured to visually indicate which of the scheduled recordings 610 is bumped if there are more scheduled recordings 610 than there are resources available to concurrently perform each of the scheduled recordings 610. For example, there may be resources sufficient to concurrently perform only two of the scheduled recordings 610. Resources associated with scheduled recordings 610 may include any resources that may be used to record media content instances, including any media content recording resources of processing subsystem 110 and/or device 400. In certain embodiments, resources associated with scheduled recordings 610 may include first and second tuners 435, respectively. Hence, one of the scheduled recordings (e.g., scheduled recording 610-2) may be bumped in accordance with a prioritization heuristic, as described previously.

The graphical object representative of the bumped recording 610-2 may be graphically distinguished from the other scheduled recordings 610-1 and 610-3 in order to visually indicate that it has been bumped. For example, the graphical object representative of the bumped recording 610-2 may include a distinct fill pattern, as shown in FIG. 6, and/or any other distinguishing feature (e.g., color, size, line weight, etc.) as may serve a particular application.

It will be recognized that GUI 600 is merely illustrative of the many different GUIs that may be used to display graphical objects representative of conflicting scheduled recordings 610 in accordance with the systems, methods, and apparatuses described herein. For example, FIG. 7 illustrates an alternative media content recording conflict resolution GUI 700 that may be used to display graphical objects representative of conflicting scheduled recordings 610.

Figure 7:
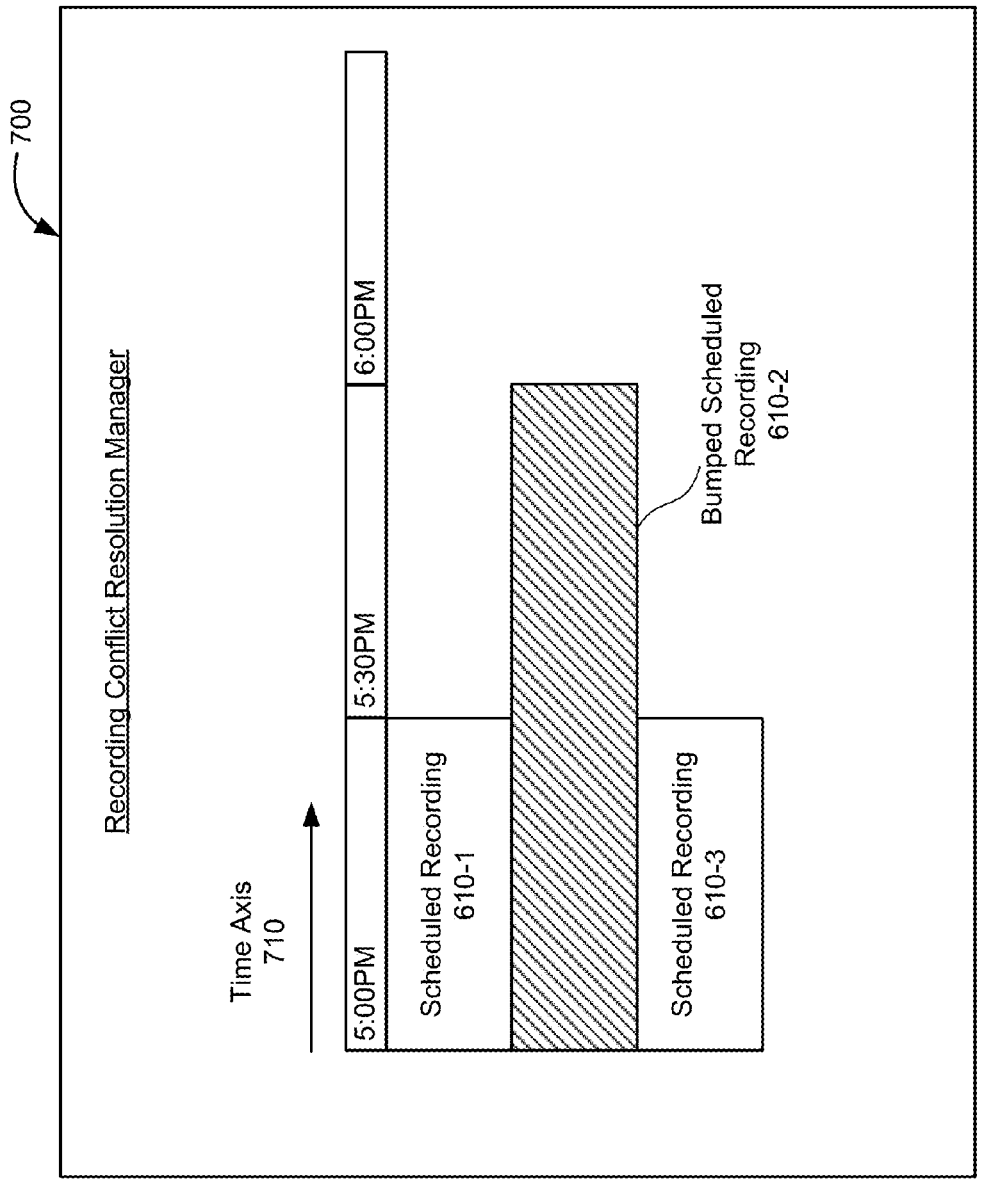

As shown in FIG. 7, the graphical objects representative of scheduled recordings 610 may be positioned along a time axis 710, which may display time indicators indicating one or more time increments or intervals along the time axis 710. Graphical objects representative of the scheduled recordings 610 may be positioned relative to the time axis 710 to visually indicate the time slots during which the scheduled recordings 610 are to be performed. In the illustrated example, scheduled recordings 610-1 and 610-3 are scheduled to be performed during a time slot of 5:00 PM-5:30 PM and scheduled recording 610-2 is scheduled to be performed during a time slot of 5:00 PM-6:00 PM. The time slots associated with scheduled recordings 610 may be determined in accordance with a transmission schedule defining when the corresponding media content instances will be transmitted to processing subsystem 110 or device 400 and available for recording. It will be recognized that although both GUIs 600 and 700 may be configured to facilitate resolution of one or more media recording conflicts, certain examples given herein are described in connection with GUI 600 for illustrative purposes only.

GUI 600 may include at least one option configured to facilitate resolution of a media content recording conflict. In certain embodiments, for example, such an option may include at least one selectable graphical object indicating at least one alternative recording opportunity for at least one of the scheduled recordings 610. In some examples, data representative of one or more of such selectable graphical objects may be generated and output by processing subsystem 110 for inclusion in GUI 600 in response to a user selection of one of the graphical objects representative of one of the scheduled recordings 610.

For example, a user may provide input in GUI 600 to instruct media recording facility 360 to cause a selector 620 to be moved to a graphical object representative of a scheduled recording (e.g., bumped scheduled recording 610-2). The input may be provided and received in any suitable way, including the user utilizing input device 140 to provide input, and processing subsystem 110 receiving and processing signals representative of the input. In certain embodiments, directional arrow buttons 520-550 and selector button 560 on the user input device 140 shown in FIG. 5 may be utilized by the user to navigate and select from the graphical objects displayed in GUI 600.

Figure 8:
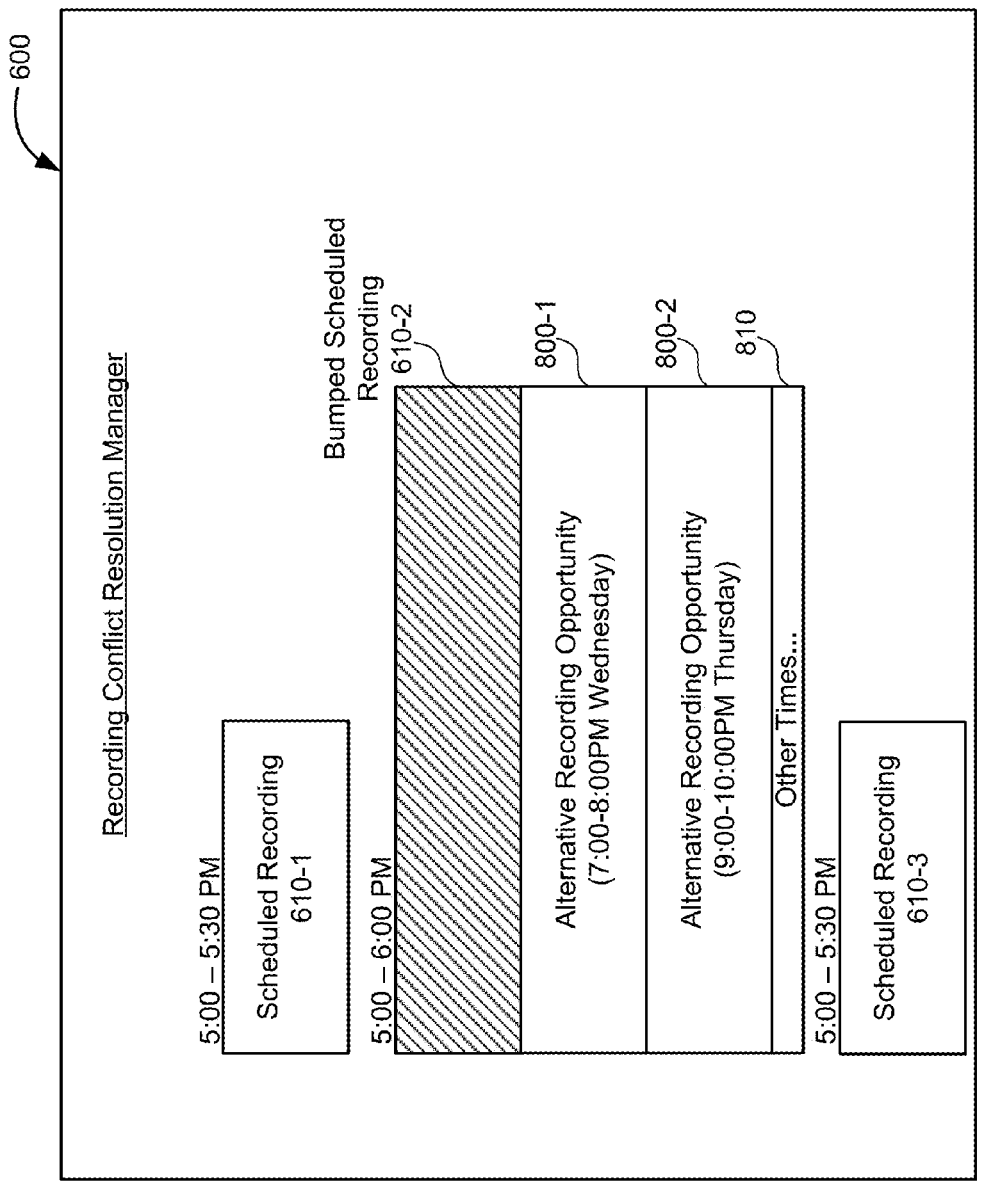

FIG. 8 shows GUI 600 after the bumped scheduled recording 610-2 has been selected with selector 620. As shown in FIG. 8, GUI 600 has been updated to display selectable graphical objects representative of alternative recording opportunities 800-1 and 800-2 (collectively referred to herein as "alternative recording opportunities 800") for the bumped scheduled recording 610-2.

The alternative recording opportunities 800 represent alternative scheduled transmission times for a media content instance associated with the bumped scheduled recording 610-2 during which the media content instance may be recorded. To illustrate, the selectable graphical objects representative of alternative recording opportunities 800 visually indicate that the media content instance associated with the bumped scheduled recording 610-2 has alternative scheduled transmission times of 7:00 PM-8:00 PM on an upcoming Wednesday and 9:00 PM-10:00 PM on an upcoming Thursday. A user may select one of the alternative recording opportunities 800 to reschedule the recording of the bumped recording 610-2 to an alternative time period that does not conflict with scheduled recordings 610-1 and 610-3. In this or similar manner, the media content recording conflict between the scheduled recordings 610 may be resolved. In some examples, an option 810 may be displayed in GUI 600 and selected to direct processing subsystem 110 or device 400 to search for and display additional alternative recording opportunities 800 for the media content instance associated with bumped scheduled recording 610-2.

The alternative recording opportunities 800 may be determined in accordance with a transmission schedule defining when the media content instance corresponding to the bumped scheduled recording 610-2 is scheduled for transmission to processing subsystem 110 or device 400 and available for recording. In some examples, alternative recording opportunities 800 for a media content instance may be filtered such that only alternative recording opportunities 800 that will not create a conflict with other scheduled recordings are presented in GUI 600 for selection by a user.

In some examples, the alternative recording opportunities 800 may represent alternative recording opportunities for the same media content instance associated with the scheduled recording (e.g., the bumped scheduled recording 610-2). For example, the media content instance associated with the bumped scheduled recording 610-2 may include a particular episode within a television series (e.g., a particular episode of a show known as "Seinfeld"). Hence, the alternative recording opportunities 800 may represent alternative recording opportunities for that particular Seinfeld episode.

Alternatively, the alternative recording opportunities 800 may represent alternative recording opportunities for media content instances related in some way to the media content instance associated with the scheduled recording (e.g., the bumped scheduled recording 610-2). For example, if the media content instance associated with the bumped scheduled recording 610-2 includes a particular episode within a television series, the alternative recording opportunities 800 may represent recording opportunities for other episodes within the television series. As another example, if the media content instance associated with the bumped scheduled recording 610-2 includes a sporting event (e.g., a football game), the alternative recording opportunities 800 may represent recording opportunities for other related sporting events (e.g., other football games).

Figure 9:
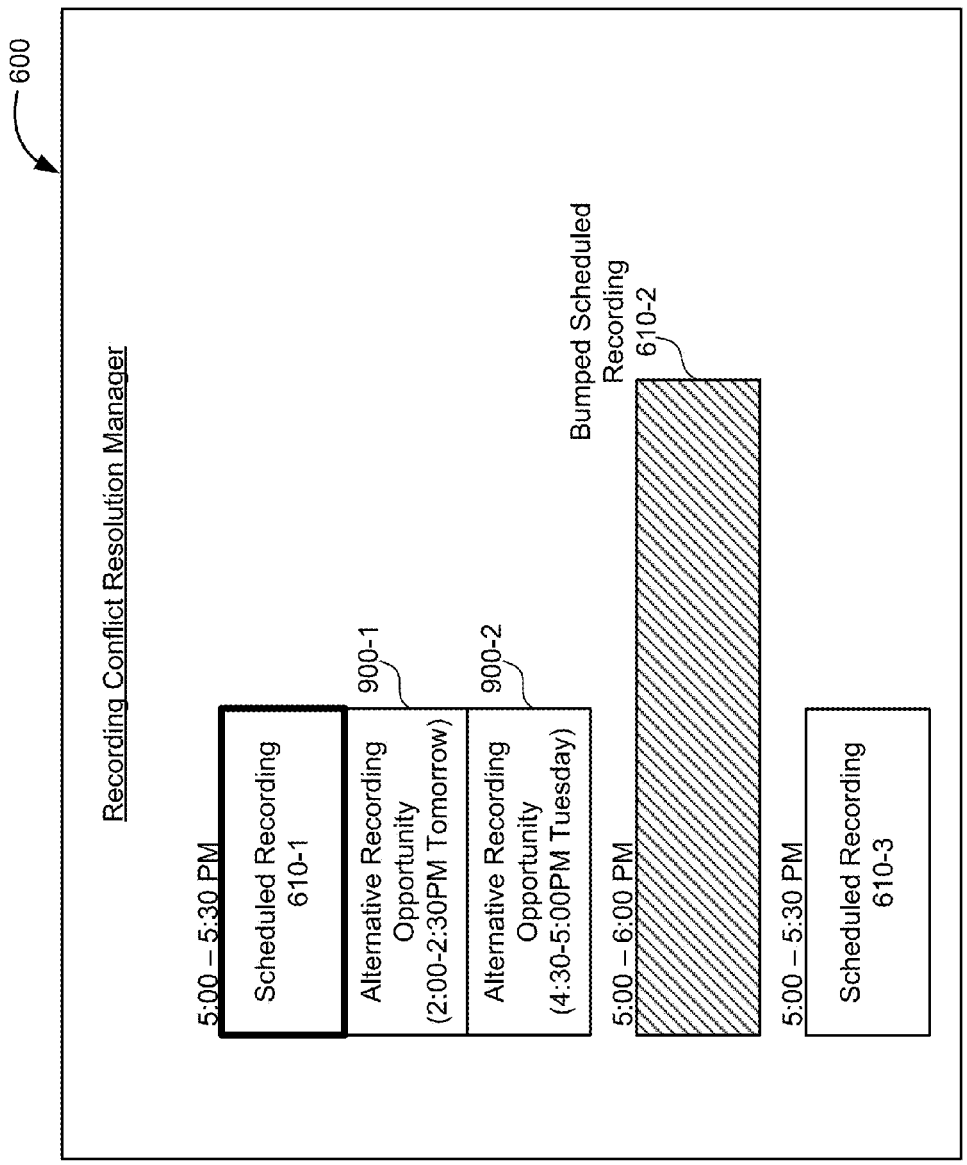
Figure 10:
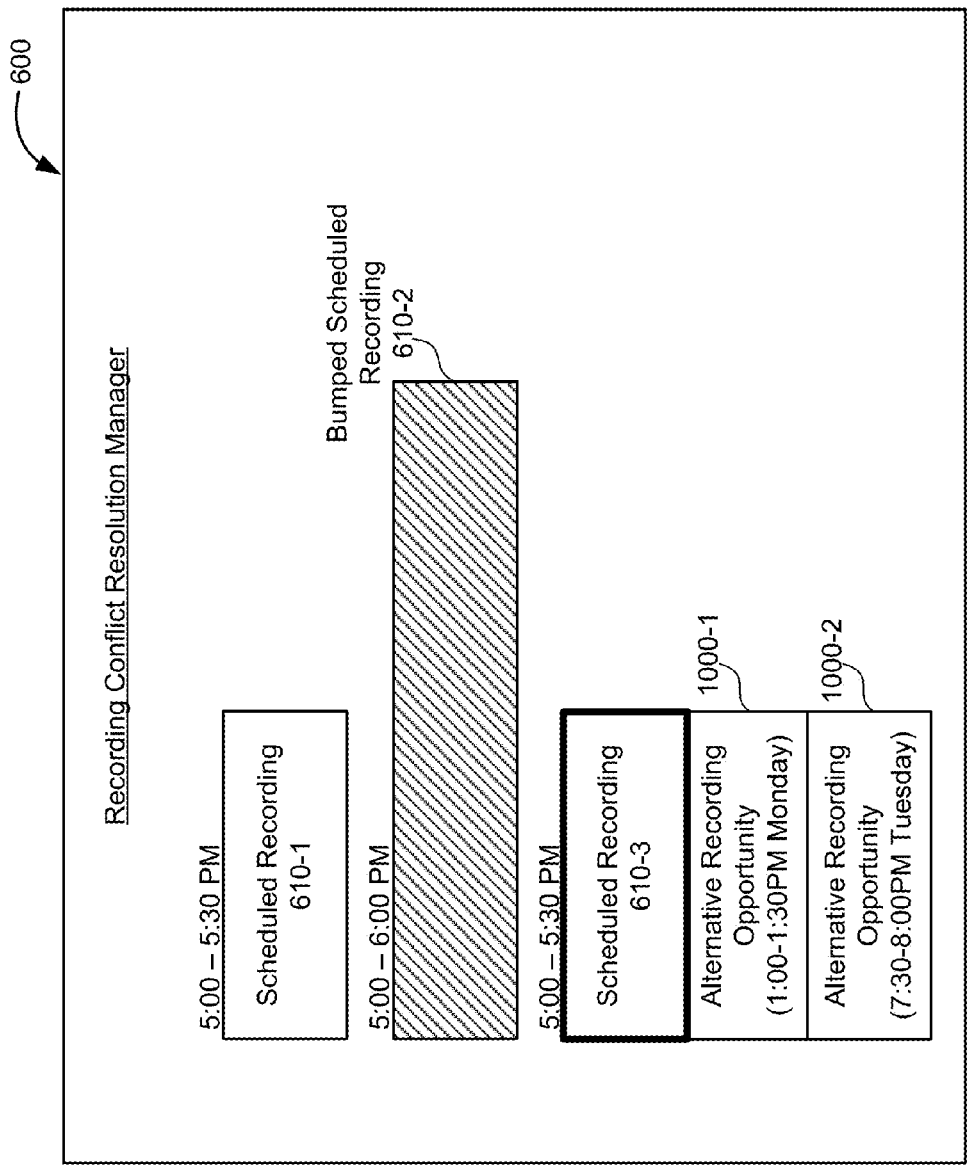

It will be recognized that any of the graphical objects representative of scheduled recordings 610 may be selected to launch a display of one or more alternative recording opportunities for any of the scheduled recordings 610. For example, FIGS. 9 and 10 show GUI 600 after graphical objects representative of scheduled recordings 610-1 and 610-3 have been selected, respectively. As shown in FIG. 9, graphical objects representative of alternative recording opportunities 900-1 and 900-2 may be displayed within GUI 600 upon user selection of scheduled recording 610-1. Likewise, as shown in FIG. 10, graphical objects representative of alternative recording opportunities 1000-1 and 1000-2 may be displayed within GUI 600 upon user selection of scheduled recording 610-3. In this manner, an alternative recording time period may be selected for one of the scheduled recordings 610-1 and 610-3. This may resolve the conflict between the scheduled recordings 610 by freeing resources and thereby facilitating performance of the bumped recording 610-2 during its originally scheduled time.

Figure 11:
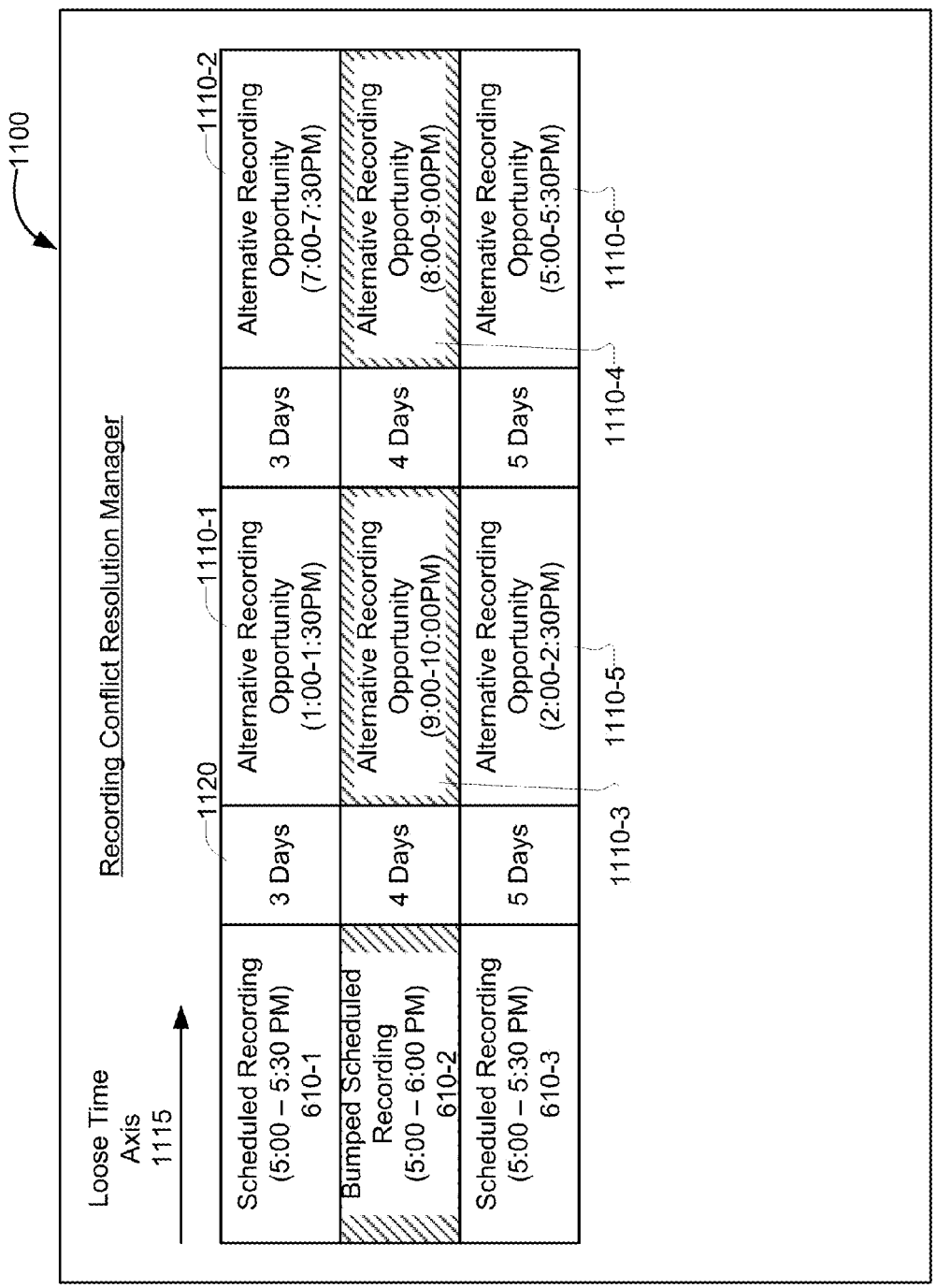

FIG. 11 illustrates a GUI 1100 including another exemplary media content recording conflict resolution view displayed therein. As shown, GUI 11 may include a two-dimensional matrix configured to include a plurality of graphical objects representative of a plurality of scheduled recordings 610 of media content instances and one or more alternative recording opportunities 1110-1 through 1110-6 (collectively referred to herein as "recording opportunities 1110") corresponding to the scheduled recordings 610. Each alternative recording opportunity 1110 represents an alternative scheduled transmission time for its corresponding scheduled recording 610.

GUI 1100 is configured to visually indicate a plurality of alternative recording opportunities 1110 for a plurality of scheduled recordings 610 within the same GUI view. To this end, each row within the matrix includes graphical objects representative of a particular scheduled recording (e.g., scheduled recording 610-1) and one or more alternative recording opportunities (e.g., alternative recording opportunities 1110-1 and 1110-2) corresponding to the particular scheduled recording arranged along a time axis 1115. The time axis 1115 may be a loosely defined time axis 1115 ("loose time axis") in order to accommodate for unaligned time periods.

In some examples, one or more placeholder graphical objects (e.g., placeholder graphical object 1120) may be positioned between graphical objects representative of scheduled recordings and alternative recording opportunities. For example, placeholder graphical object 1120 is positioned between graphical objects representative of scheduled recording 610-1 and alternative recording opportunity 1110-1 in GUI 1100.

Each of the placeholder graphical objects in GUI 1100 may visually indicate a time period between a scheduled recording 610 and an alternative recording opportunity 1110. For example, placeholder graphical object 1120 visually indicates that alternative recording opportunity 1110-1 is associated with a transmission time period that is scheduled to begin three days after scheduled recording 610-1 is scheduled to be performed.

A user may utilize input device 140 to browse through the matrix provided in GUI 1100 and select non-conflicting recording times for any of the scheduled recordings 610. Processing subsystem 110 or device 400 may accordingly reschedule one or more of the scheduled recordings 610 to a time period associated with one or more of the alternative recording opportunities 1110 in response to user selection of one or more of the selectable graphical objects representative of one or more of the alternative recording opportunities 1110.

Figure 12:
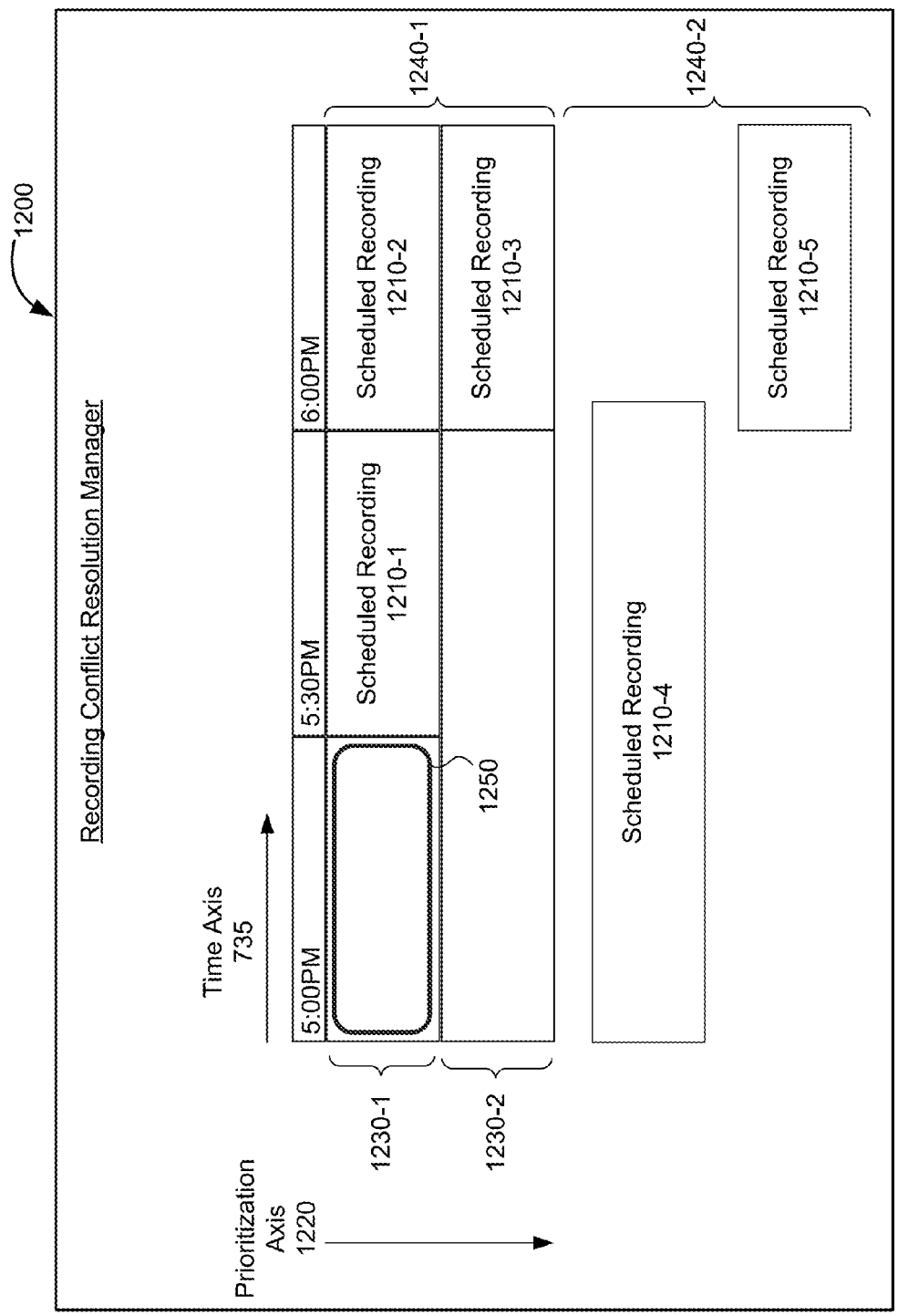

FIG. 12 illustrates a GUI 1200 including another exemplary media content recording conflict resolution view displayed therein. As shown, GUI 1200 may include a plurality of graphical objects representative of a plurality of scheduled recordings of media content instances. In FIG. 12, the scheduled recordings include scheduled recordings 1210-1 through 1210-5, which may be collectively referred to as "scheduled recordings 1210."

The graphical objects representative of scheduled recordings 1210 may be positioned along time axis 710, which may display time indicators associated with one or more time slots during which the scheduled recordings 1210 are scheduled to be performed. In the illustrated example, scheduled recording 1210-1 is scheduled to be performed during a time slot of 5:30 PM-6:00 PM, scheduled recordings 1210-2, 1210-3, and 1210-5 are scheduled to be performed during a time slot of 6:00 PM-6:30 PM, and scheduled recording 1210-4 is scheduled to be performed during a time slot of 5:00 PM-6:05 PM. The time slots associated with scheduled recordings 1210 may be determined in accordance with a transmission schedule defining when the corresponding media content instances will be transmitted to processing subsystem 110 or device 400 and available for recording.

The graphical objects representative of scheduled recordings 1210 may also be positioned along a prioritization axis 1220. The position of graphical objects representative of scheduled recordings 1210 along prioritization axis 1220 may visually indicate a priority order for the scheduled recordings. In certain embodiments, higher priority scheduled recordings 1210 may be positioned nearer one end (e.g., the top) of prioritization axis 1220 and lower priority scheduled recordings 1210 may be positioned farther from the end (e.g., the top) of the prioritization axis 1220. In FIG. 12, for instance, placement of scheduled recordings 1210-2, 1210-3, and 1210-5 relative to one another along prioritization axis 1220 may indicate that the scheduled recordings 1210-2, 1210-3, and 1210-5 are prioritized with scheduled recording 1210-2 having first priority, scheduled recording 1210-3 having second priority, and scheduled recording 1210-5 having third priority.

Positions of scheduled recordings 1210 along prioritization axis 1220 may provide a visual indication of a resource-based prioritization of the scheduled recordings 1210. The visual indication of a resource-based prioritization of scheduled recordings 1210 may be at least part of an option included in GUI 1200 and configured to facilitate resolution of a media content recording conflict.

A visual indication of a resource-based prioritization of scheduled recordings 1210 may visually indicate one or more resources that are scheduled to be used to perform one or more of the scheduled recordings 1210. For example, in FIG. 12 a first section 1230-1 along prioritization axis 1220 may be associated with a particular resource. Positions of graphical objects representative of scheduled recordings 1210-1 and 1210-2 within the first section 1230-1 in GUI 1200 may indicate that the particular resource is scheduled to be used to perform the scheduled recordings 1210-1 and 1210-2. In FIG. 12, a second section 1230-2 along prioritization axis 1220 may be associated with another resource, and a position of a graphical object representative of scheduled recording 1210-3 within the second section 1230-2 may indicate that the other resource is scheduled to be used to perform the scheduled recording 1210-3. Accordingly, a user may view which resource(s) are scheduled to be used to record one or more scheduled recordings 1210 of media content instances.

The resources associated with sections 1230-1 and 1230-2 in FIG. 12 may include any resources that may be used to record media content instances, including any media content recording resources of processing subsystem 110 and/or device 400. In certain embodiments, the resources associated with sections 1230-1 and 1230-2 may include first and second tuners 435, respectively.

The visual indication of resource-based prioritization of scheduled recordings 1210 of media content instances may include a first subset 1240-1 and a second subset 1240-2 of the scheduled recordings 1210. The first subset 1240-1 may include graphical objects representative of one or more of the scheduled recordings 1210 that are associated with at least one resource scheduled to be used to perform the scheduled recordings 1210. The second subset 1240-2 may include graphical objects representative of one or more bumped scheduled recordings 1210. That is, resources are not scheduled to be used to perform the scheduled recordings 1210 in the second subset 1240-2. In FIG. 12, the first subset 1240-1 includes scheduled recordings 1210-1, 1210-2, and 1210-3, and the second subset 1240-2 includes scheduled recordings 1210-4 and 1210-5. Thus, from a visual indication of resource-based prioritization in GUI 1200, a user may ascertain that scheduled recordings 1210-1, 1210-2, and 1210-3 are scheduled to be performed by available resources and that scheduled recordings 1210-4 and 1210-5 are not associated with nor scheduled to be performed by any resource. In other words, scheduled recordings 1210-1, 1210-2, and 1210-3 have been prioritized over scheduled recordings 1210-4 and 1210-5, and scheduled recordings 1210-4 and 1210-5 have been "bumped" and consequently will not be performed as scheduled.

As mentioned, GUI 1200 may include at least one option configured to facilitate resolution of a media content recording conflict. In certain embodiments, for example, such an option may include a user tool configured to facilitate reprioritization of scheduled recordings 1210. An example of a user utilizing a user tool to reprioritize scheduled recordings 1210 in the resource-based prioritization indicated in GUI 1200 will now be described.

For example, the user may wish to prioritize scheduled recording 1210-5 over scheduled recording 1210-3 such that scheduled recording 1210-5 will be performed and scheduled recordings 1210-3 will be bumped. To this end, the user may provide input instructing media recording facility 360 to cause a selector 1250 to be moved to a graphical object representative of scheduled recording 1210-5. The input may be provided and received in any suitable way, including the user utilizing input device 140 to provide input, and processing subsystem 110 receiving and processing signals representative of the input. In certain embodiments, directional arrow buttons 520-550 and selector button 560 on the user input device 140 shown in FIG. 5 may be utilized by the user to navigate and select from the graphical objects and options displayed in GUI 1200.

Figure 13:
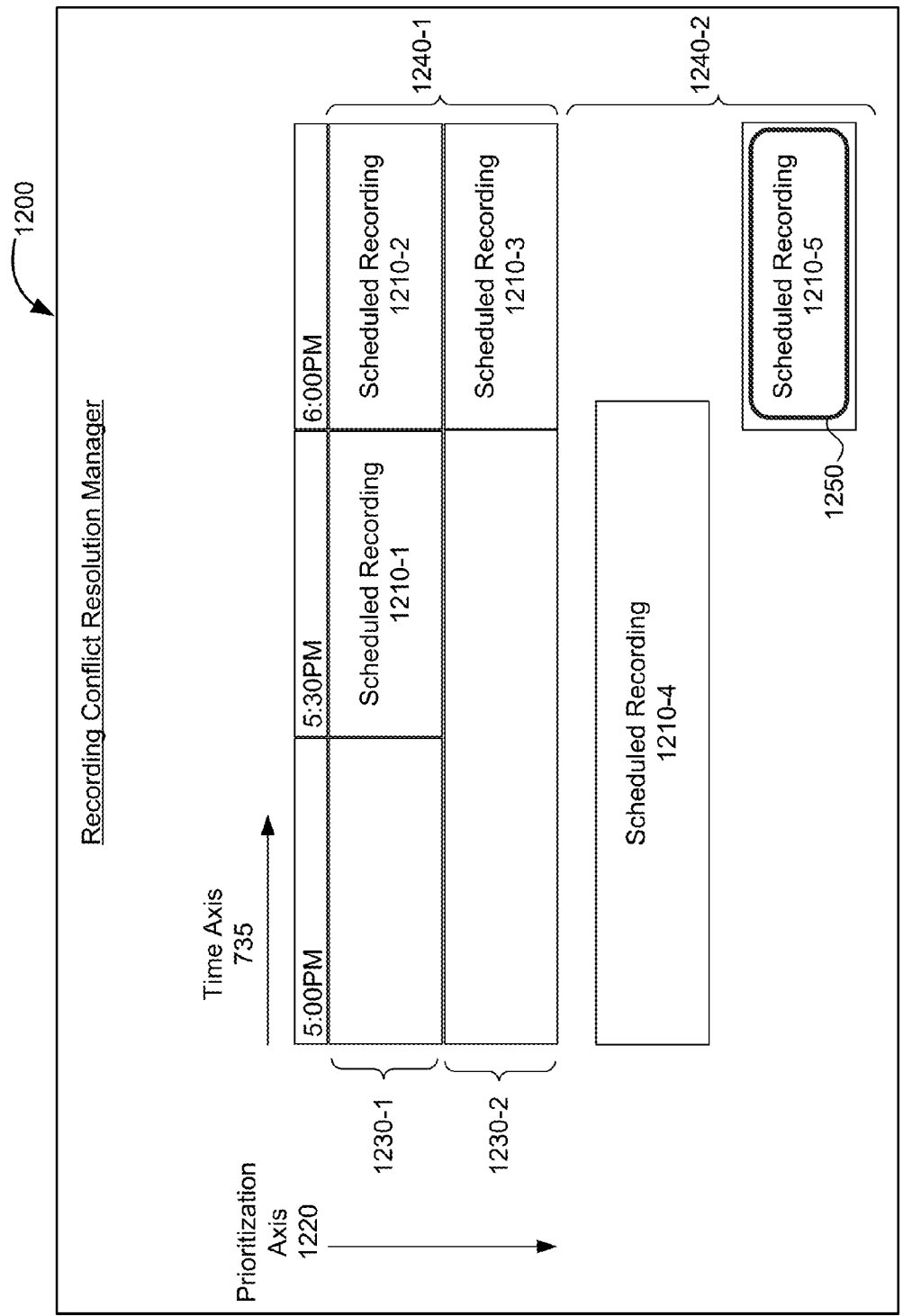

FIG. 13 illustrates the GUI 1200 of FIG. 12 with selector 1250 positioned at a graphical object representative of scheduled recording 1210-5. When the graphical object representative of scheduled recording 1210-5 is selected, a user tool including one or more selectable options configured to facilitate reprioritization of scheduled recording 1210-5 may be displayed in GUI 1200.

Figure 14:
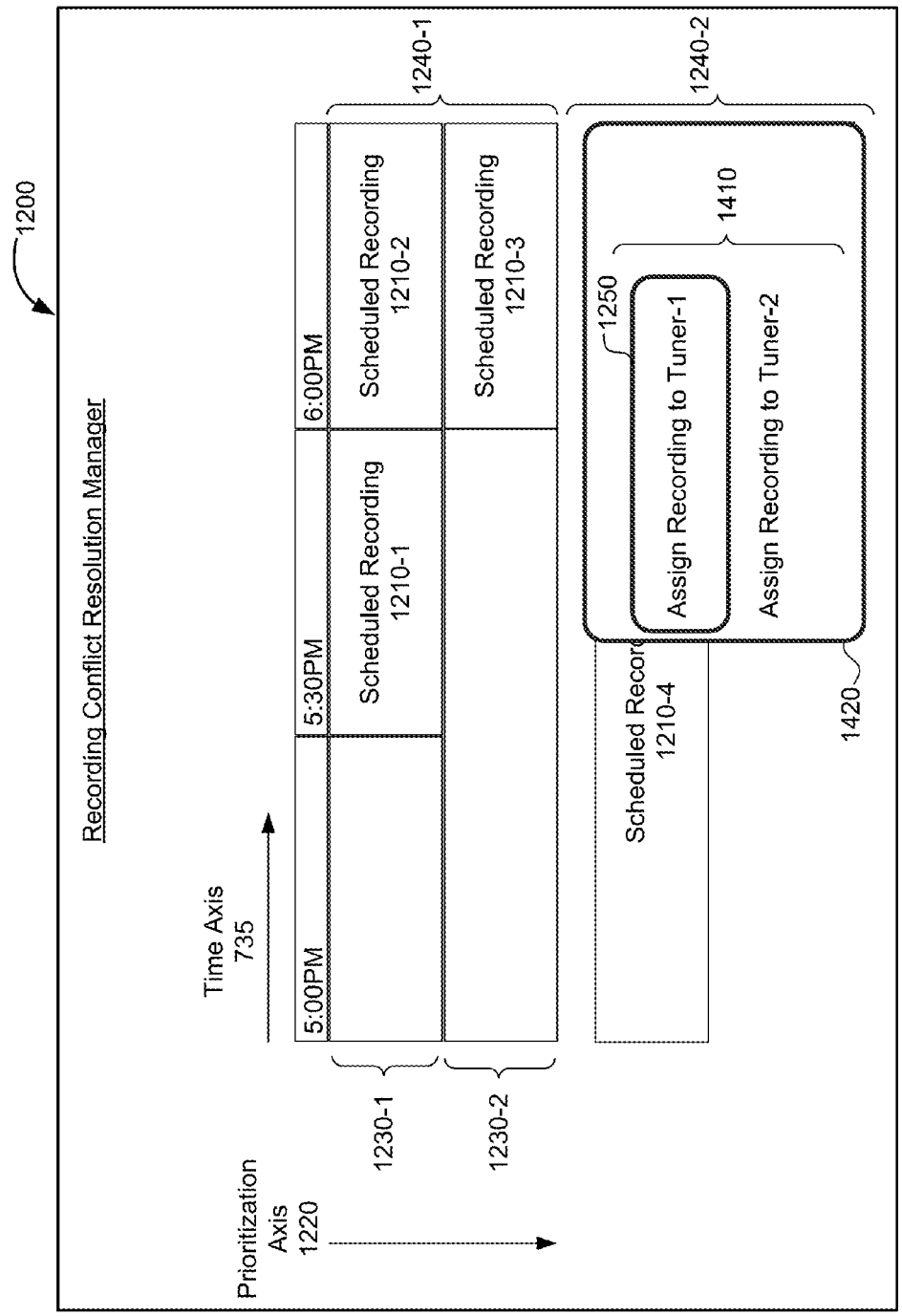

FIG. 14 illustrates the GUI 1200 of FIG. 13 with a plurality of selectable options 1410 configured to facilitate reprioritization of scheduled recording 1210-5 displayed therein. The selectable options 1410 may be displayed in any suitable manner, such as in a pop-up window 1420, for example. As shown in FIG. 14, the selectable options 1310 may include options for assigning the scheduled recording 1210-5 to one or more resources (e.g., tuners 435) that may be used for performing the recording. In FIG. 14, the options include an option for assigning the scheduled recording 1210-5 to a first tuner 435 and an option for assigning the scheduled recording 1210-5 to a second tuner 435. These options are illustrative only. Other options configured to facilitate reprioritization of scheduled recording 1210-5 may be additionally or alternatively displayed in GUI 1200. For example, pop-up window 1420 may display options for swapping scheduled recording 1210-5 with another of the scheduled recordings 1210-2 or 1210-3 in the priority order.

Figure 15:
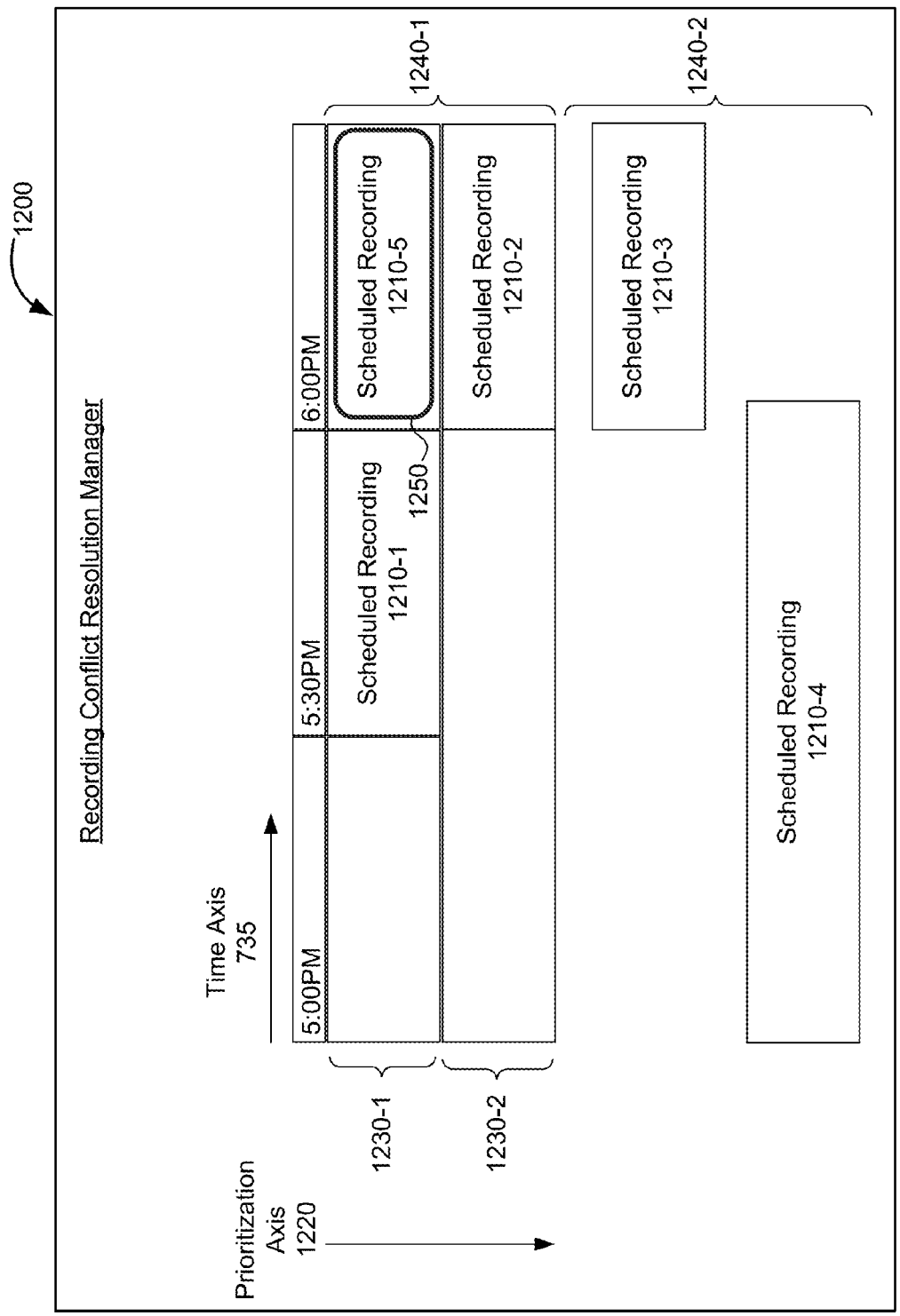

When the user selects the option for assigning scheduled recording 1210-5 to a resource associated with section 1230-1 (e.g., to a first tuner 435), media recording facility 360 may modify the resource-based prioritization and visually indicate the modified priority order in GUI 1200. For example, FIG. 15 illustrates GUI 1200 with scheduled recordings 1210-2, 1210-3, and 1210-5 reprioritized such that scheduled recording 1210-5 is assigned to be performed using the resource associated with section 1230-1. Scheduled recording 1210-2 has been moved from the section 1230-1 associated with the resource to section 1230-2 associated with another resource. Accordingly, scheduled recording 1210-2 is now scheduled to be performed using the other resource (e.g., a second tuner 435). Scheduled recording 1210-3 has been bumped as illustrated by the position of the graphical object representative of the scheduled recording 1210-3 in second subset 1240-2. Scheduled recording 1210-4 remains in the second subset 1240-2 and is now in a position of lowest priority out of scheduled recordings 1210-2 through 1210-5.

Figure 16:
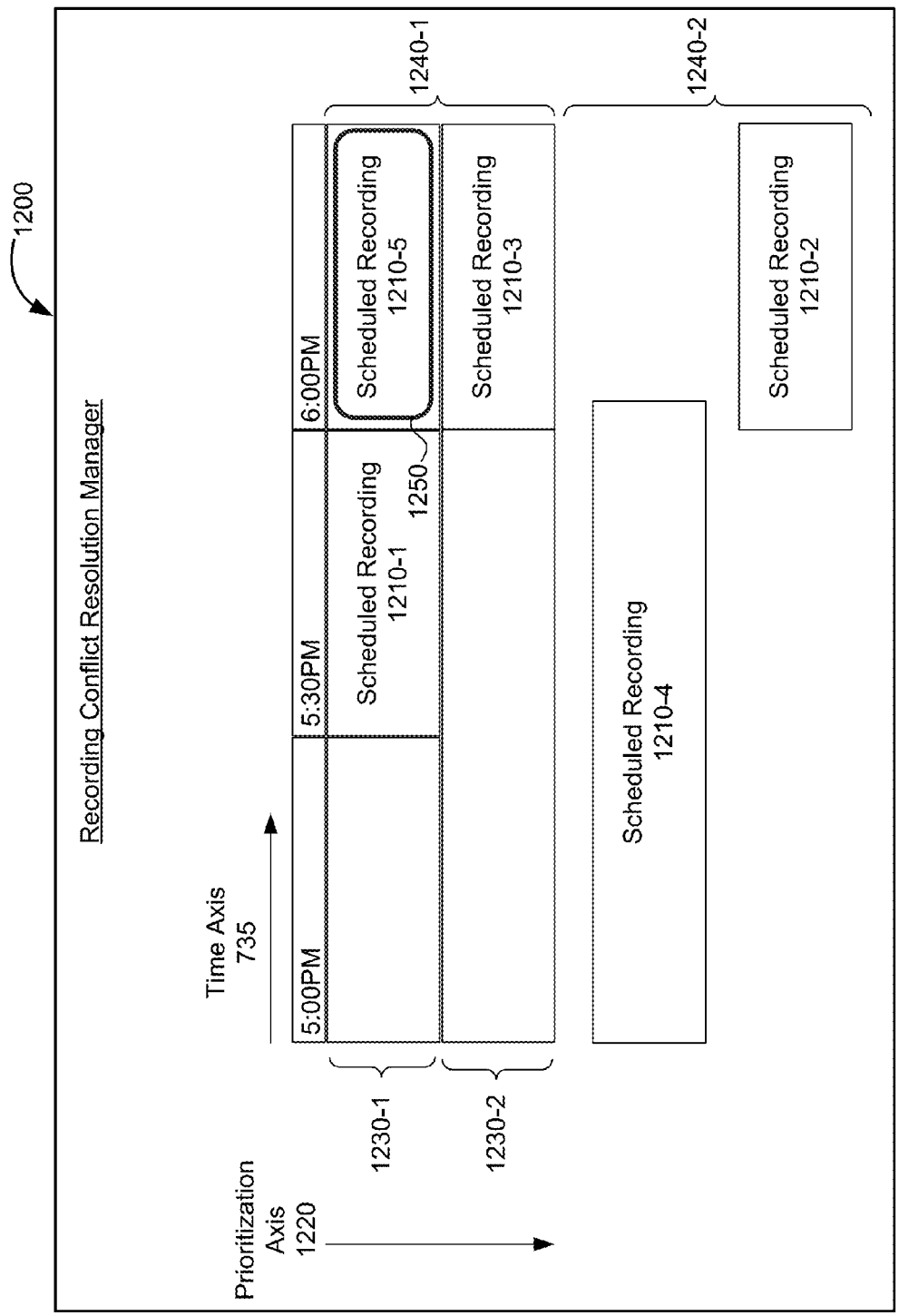

Alternative to shifting scheduled recordings 1210-2 through 1210-4 downward in the priority order as illustrated in FIG. 15, scheduled recording 1210-5 may swap priorities with scheduled recording 1210-2. FIG. 16 illustrates GUI 1200 after scheduled recording 1210-5 has swapped priorities with scheduled recording 1210-2. In FIG. 16, graphical objects representative of scheduled recordings 1210-2 and 1210-5 have swapped positions from those shown in FIG. 12.

In the above-described or similar manner, a user may reprioritize conflicting scheduled recordings 1210 as may suit a particular preference. After media recording facility 360 has reprioritize scheduled recordings 1210 in a recording schedule based on user input, media recording facility 360 may mark the associated media content recording conflict as resolved and proceed to operate in accordance with the recording schedule.

Additionally or alternatively, GUI 1200 may include at least one other option configured to facilitate resolution of a media content recording conflict. In certain embodiments, for example, such an option may include a visual indication of time slots associated with the scheduled recordings 1210 of media content instances and a user tool configured to facilitate modification of one or more of the time slots associated with the scheduled recordings 1210 of media content instances.

Returning to FIG. 12, for example, the graphical objects representative of the scheduled recordings 1210 may be sized and positioned along time axis 710 in a manner that visually indicates the time slots associated with the scheduled recordings 1210. As mentioned above, in the illustrated example, scheduled recording 1210-1 is scheduled to be performed during a time slot of 5:30 PM-6:00 PM, scheduled recordings 1210-2, 1210-3, and 1210-5 are scheduled to be performed during a time slot of 6:00 PM-6:30 PM, and scheduled recording 1210-4 is scheduled to be performed during a time slot of 5:00 PM-6:05 PM. The use of size and position of the graphical objects representative of scheduled recordings 1210 relative to time axis 710 is just one way of visually indicating time slots associated with the scheduled recordings 1210. Any other suitable visual indication of the time slots may be used in other embodiments.

Figure 17:
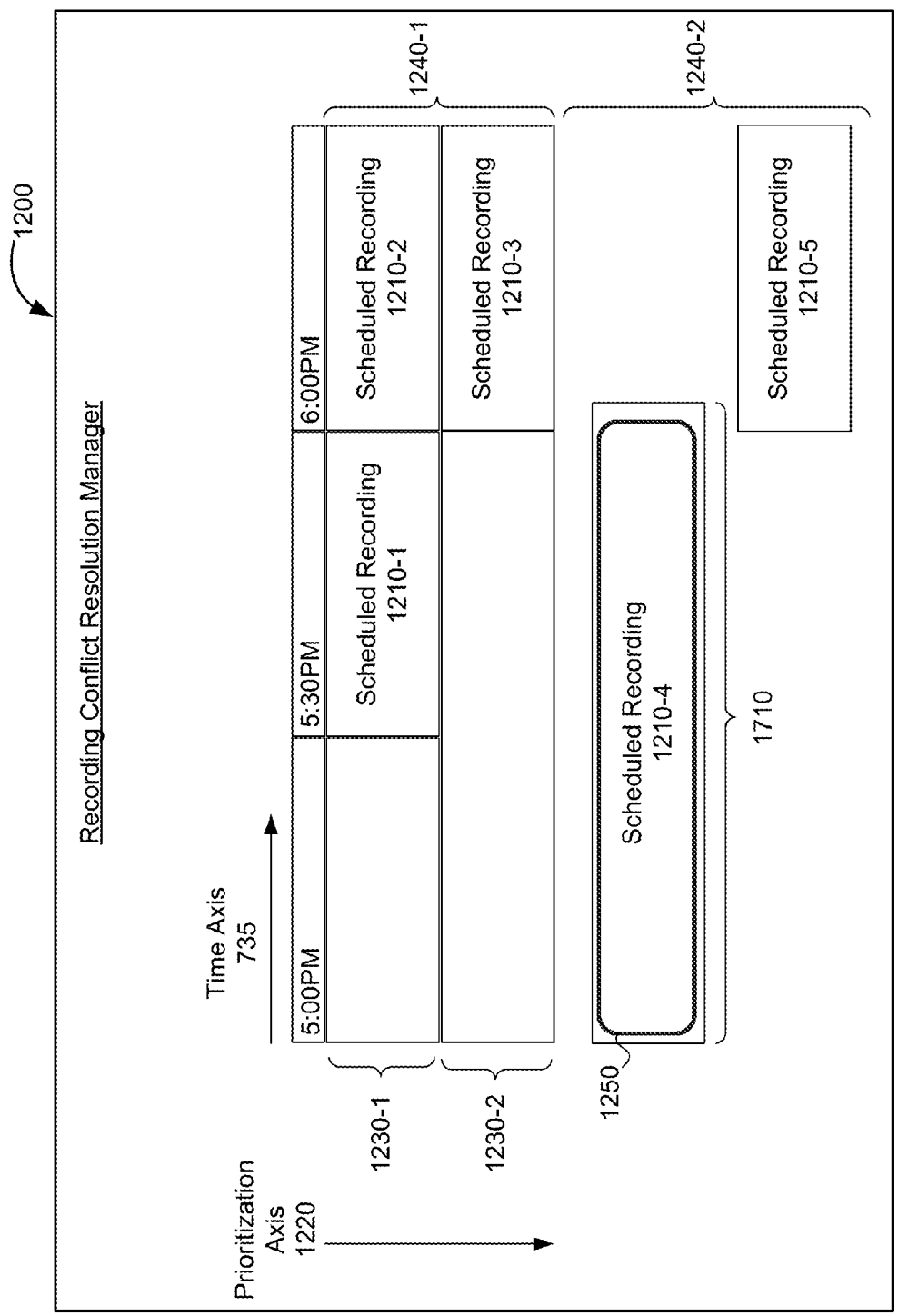

FIG. 17 illustrates the GUI 1200 of FIG. 12 with selector 1250 positioned at a graphical object representative of scheduled recording 1210-4 and a time slot associated with the scheduled recording 1210-4 identified by reference number 1710 ("time slot 1710"). When the graphical object representative of scheduled recording 1210-4 is selected in FIG. 17, a user tool including one or more selectable options configured to facilitate modification of time slot 1710 for scheduled recording 1210-4 may be displayed in GUI 1200.

Figure 18:
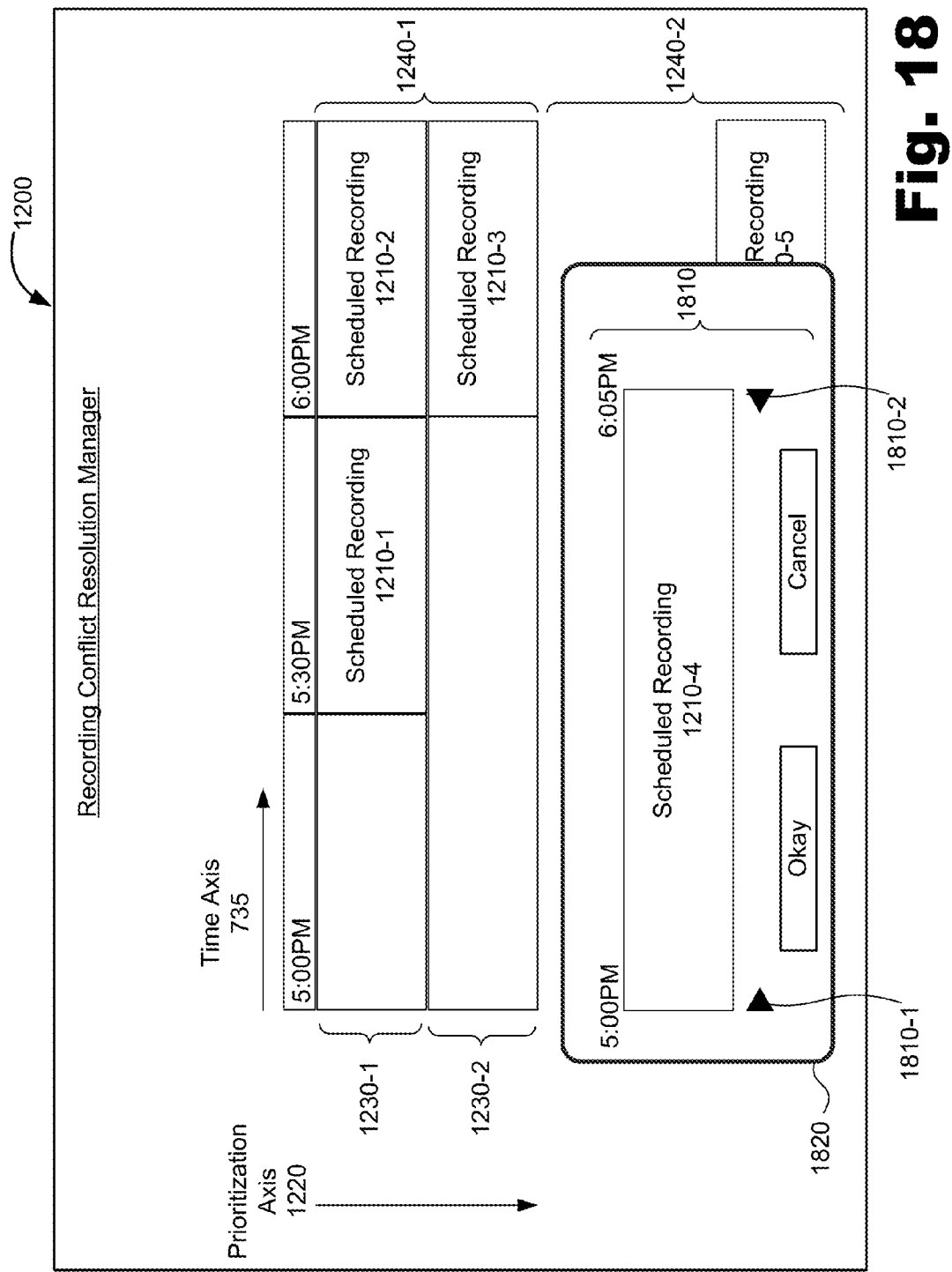

FIG. 18 illustrates the GUI 1200 of FIG. 17 with a plurality of selectable options 1810 configured to facilitate modification of the time slot 1710 associated with scheduled recording 1210-4. The selectable options 1810 may be displayed in GUI 1200 in any suitable manner, such as in a pop-up window 1820, for example. The selectable options 1810 may include options for modifying time slot 1710 for scheduled recording 1210-4. As shown in FIG. 18, pop-up window 1820 may include a graphical object representative of scheduled recording 1210-4 and may indicate start (e.g., 5:00 PM) and end (e.g., 6:05 PM) times for the time slot 1710 for the scheduled recording 1210-4. The selectable options 1810 may include a start-time shift option 1810-1 that when selected by a user will cause the start time of time slot 1710 to be shifted forward in time to a later start time and an end-time shift option 1810-2 that when selected by a user will cause the end time of time slot 1710 to be shifted backward in time to an earlier end time. Accordingly, a user may utilize one or more of the selectable options 1810 to clip a beginning and/or an end portion of time slot 1710 and thereby shorten the length of the time slot 1710 associated with scheduled recording 1210-4.

Any suitable user input may be used to select one or more of the selectable options 1810. In certain embodiments, each selection of start-time shift option 1810-1 or end-time shift option 1810-2 may cause time slot 1710 to be clipped by a predefined length of time (e.g., one minute).

Figure 19:
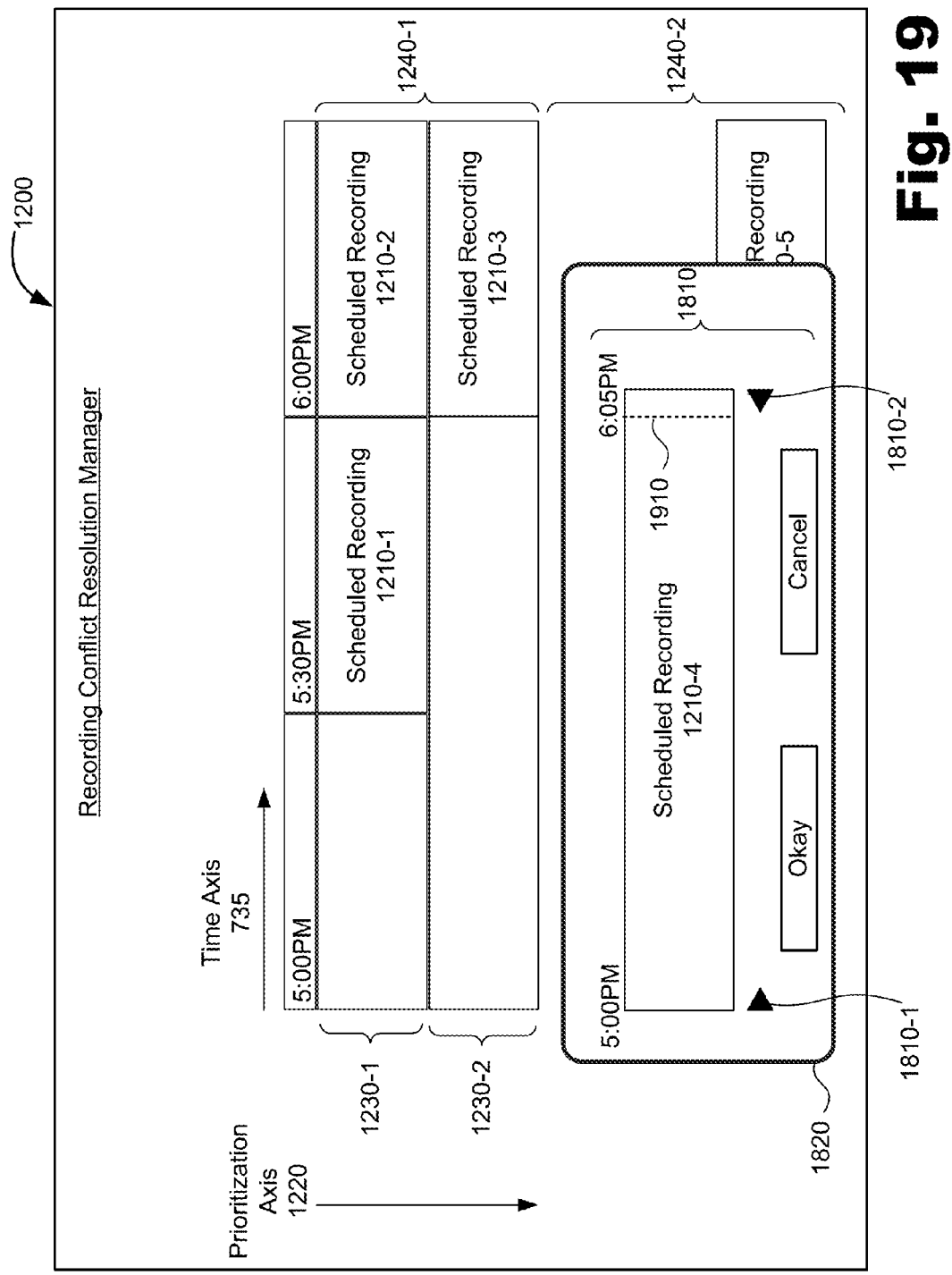

FIG. 19 illustrates the GUI 1200 of FIG. 18 after a user has selected end-time shift option 1810-2 in order to shorten time slot 1710 by five minutes. A visual representation of the time slot 1710 shortened by five minutes may be illustrated in GUI 1200, such as by displaying a dashed line 1910 or other visual indication of a new end time for the time slot 1710 for scheduled recording 1210-4.

Figure 20:
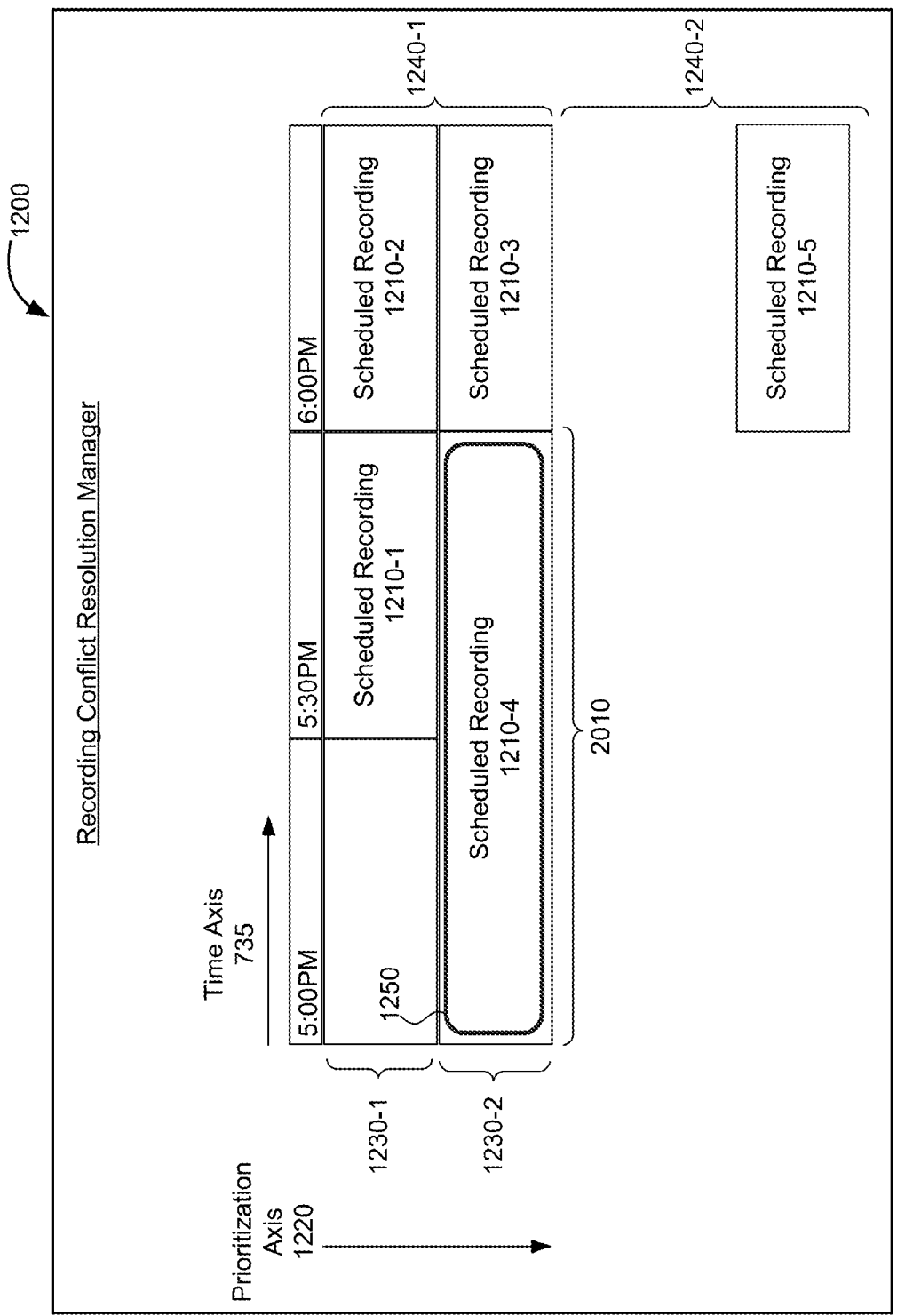

When the modification to time slot 1710 is accepted by the user, the time slot 1710 for the scheduled recording 1210-4 may be modified accordingly. The modification to the scheduled recording 1210-4 may be visually indicated in GUI 1200. For example, FIG. 20 illustrates the GUI 1200 of FIG. 18 with a graphical object representative of scheduled recording 1210-4 displayed therein. As shown, the graphical object may be sized and positioned in GUI 1200 to indicate a modified time slot associated with the scheduled recording. The modified time slot is represented by reference number 2010 in FIG. 20.

As further shown in FIG. 20, the above-described modification to time slot 1710 to produce modified time slot 2010 for scheduled recording 1210-4 may resolve a media content recording conflict. Before the modification, time slot 1710 overlapped with other time slots for scheduled recordings 1210-2 and 1210-3, leaving no resources available to record the final five minutes of the media content instance associated with scheduled recording 1210-4. With the final five minutes of the scheduled recording 1210-4 clipped, the conflict with scheduled recordings 1210-2 and 1210-3 is resolved. As shown in FIG. 20, the graphical object representative of the modified scheduled recording 1210-4 is positioned within section 1230-2, meaning that a particular resource (e.g., a second tuner) is scheduled for use in performing the modified scheduled recording 1210-4 during modified time slot 2010 from 5:00 PM to 6:00 PM. At 6:00 PM, the resource may transition from recording the media content instance associated with scheduled recording 1210-4 to recording the media content instance associated with scheduled recording 1210-3.

Such a modification of a time slot associated with a scheduled recording may allow a user to prioritize overlapping recordings on a granular level. For example, the media content instance associated with scheduled recording 1210-4 may be a movie. A user may realize that the final portion of the movie will include presentation of movie credits. The user may not care to view the credits and may clip the time slot for the scheduled recording 1210-4 in order to resolve a recording conflict as described above.

Figure 21:
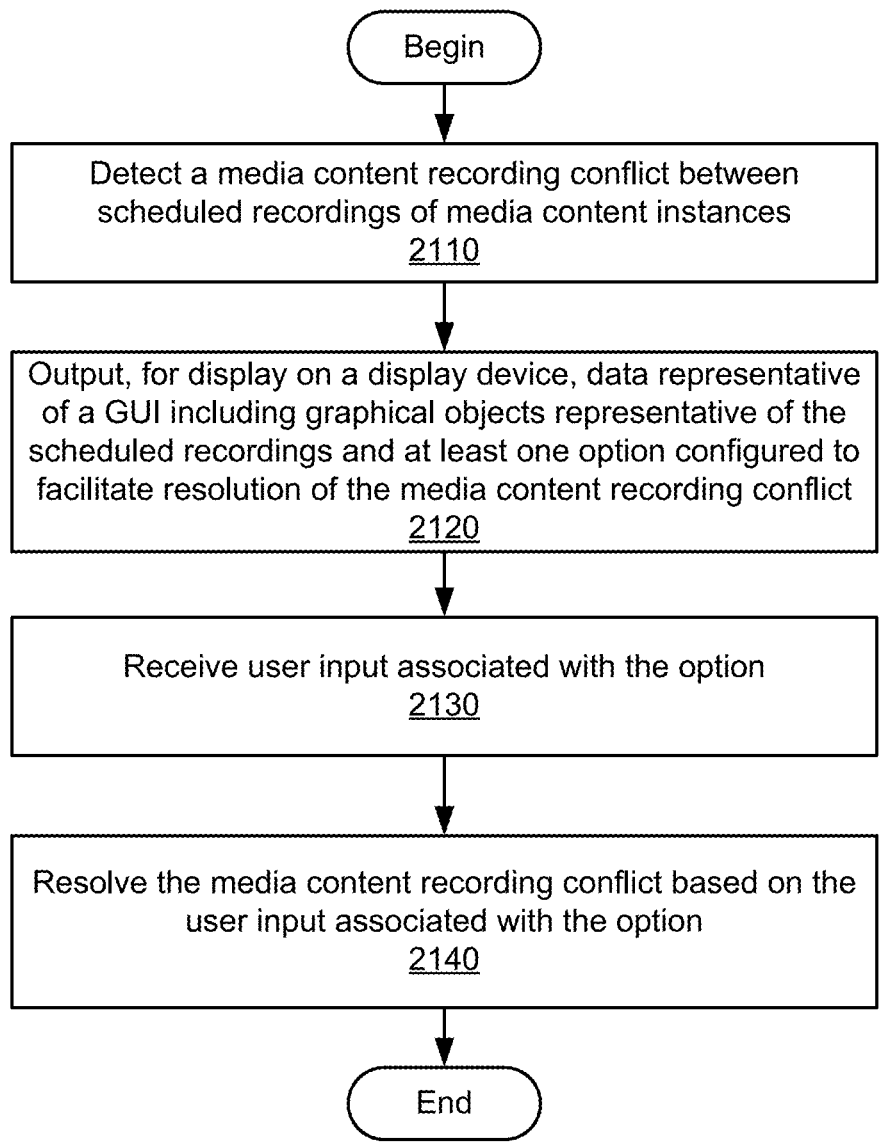
FIG. 21 illustrates an exemplary method of facilitating resolution of a media content recording conflict.

FIG. 21 illustrates an exemplary method of handling a failed recording event. While FIG. 21 illustrates exemplary steps according to one embodiment, other embodiments may omit, add to, reorder, and/or modify any of the steps shown in FIG. 21. In certain embodiments, one or more of the steps shown in FIG. 21 are performed by media content processing subsystem 110 and/or device 400.

In step 2110, a media content recording conflict between scheduled recordings of media content instances is detected. Step 2110 may be performed in any of the ways described above, including media recording facility 360 of processing subsystem 110 detecting the conflict based on recording schedule data.

In step 2120, data representative of a GUI is output for display on a display device. Step 2120 may be performed in any of the ways described above, including processing subsystem 110 or device 400 outputting the data representative of the GUI to display device 130. As described above, the GUI may include graphical objects representative of a plurality of scheduled recordings of media content instances and at least one option configured to facilitate resolution of the media content recording conflict. The option may include one or more of the options described above, including one or more options configured to facilitate user selection of one or more alternative recordings opportunities for recording one or more media content instances at different time periods, one or more options configured to facilitate reprioritization of scheduled recordings, and one or more options configured to facilitate modification (e.g., clipping) of time slots associated with scheduled recordings.

In step 2130, user input associated with the option is received. Step 2130 may be performed in any of the ways described above, and may include receiving user input indicative of a user selection of one or more options configured to facilitate resolution of the media content recording conflict.

In step 1240, the media content recording conflict is resolved based on the user input associated with the option. Step 2140 may be performed in any of the ways described above, including rescheduling a scheduled recording of a media content instance for another time period, reprioritizing conflicting scheduled recordings, and/or modifying (e.g., clipping) a time slot for a scheduled recording.

The preceding description has been presented only to illustrate and describe exemplary embodiments with reference to the accompanying drawings. It will, however, be evident that various modifications and changes may be made thereto, and additional embodiments may be implemented, without departing from the scope of the invention as set forth in the claims that follow. The above description and accompanying drawings are accordingly to be regarded in an illustrative rather than a restrictive sense.

What is claimed is:

1. A method comprising:
   detecting, on a media content recording device, a media content recording conflict between a plurality of scheduled recordings of media content instances;
   providing, for display on a display device in response to the detecting of the media content recording conflict, a graphical user interface view that comprises a plurality of scheduled recording graphical objects that represent scheduled recording time slots for the plurality of scheduled recordings involved in the media content recording conflict;
   detecting a user selection of a scheduled recording graphical object included in the plurality of scheduled recording graphical objects, the scheduled recording graphical object representing a scheduled recording time slot for a scheduled recording of a media content instance included in the plurality of scheduled recordings of media content instances, the scheduled recording graphical object positioned within a particular row in the graphical user interface view to visually indicate that the scheduled recording of the media content instance will not be performed because of the media content recording conflict; and
   providing, in the graphical user interface view in response to the detecting of the user selection of the scheduled recording graphical object,
      a start-time shift option for use by a user to provide input to specify an adjustment of a scheduled start time of the scheduled recording time slot to a later start time, and
      an end-time shift option for use by the user to provide input to specify an adjustment of a scheduled end time of the scheduled recording time slot to an earlier end time;
   detecting a user selection of at least one of the start-time shift option and the end-time shift option;
   modifying, in response to the detecting of the user selection of the at least one of the start-time shift option and the end-time shift option, at least one of the scheduled start time and the scheduled end time of the scheduled recording time slot to shorten a length of the scheduled recording time slot;
   detecting that the shortened length of the scheduled recording time slot resolves the media content recording conflict;
   removing, in response to the detecting that the shortened length of the scheduled recording time slot resolves the media content recording conflict, the scheduled recording graphical object representing the scheduled recording time slot for the scheduled recording of the media content instance from the particular row in the graphical user interface view; and
   adding, in response to the detecting that the shortened length of the scheduled recording time slot resolves the media content recording conflict, a new scheduled recording graphical object representing the shortened scheduled recording time slot for the modified scheduled recording of the media content instance to a different particular row in the graphical user interface view to visually indicate that the modified scheduled recording of the media content instance will be performed.

2. The method of claim 1, wherein:
   the start-time shift option is selectable by the user to incrementally shift the scheduled start time of the scheduled recording time slot to the later start time; and
   the end-time shift option is selectable by the user to incrementally shift the scheduled end time of the scheduled recording time slot to the earlier end time.

3. The method of claim 2, wherein:
   the detecting of the user selection of at least one of the start-time shift option and the end-time shift option comprises detecting a user selection of the end-time shift option; and
   the modifying of the at least one of the scheduled start time and the scheduled end time comprises incrementally shifting, in response to the detecting of the user selection of the end-time shift option, the scheduled end time of the scheduled recording time slot by a predefined length of time.

4. The method of claim 2, wherein:
   the detecting of the user selection of at least one of the start-time shift option and the end-time shift option comprises detecting a user selection of the start-time shift option; and
   the modifying of the at least one of the scheduled start time and the scheduled end time comprises incrementally shifting, in response to the detecting of the user selection of the start-time shift option, the scheduled start time of the scheduled recording time slot by a predefined length of time.

5. The method of claim 1, wherein:
   the graphical user interface view includes a time axis; and
   the scheduled recording graphical object comprises a scheduled recording cell arranged relative to the time axis to represent the scheduled recording time slot for the scheduled recording of the media content instance.

6. The method of claim 5, further comprising:
   the detecting of the user selection of at least one of the start-time shift option and the end-time shift option comprises detecting a user selection of the end-time shift option;
   the modifying of the at least one of the scheduled start time and the scheduled end time comprises incrementally shifting, in response to the detecting of the user selection of the end-time shift option, the scheduled end time of the scheduled recording time slot by a predefined length of time to shorten the length of the scheduled recording time slot; and providing, for display within the scheduled recording cell in response to the incrementally shifting of the scheduled end time of the scheduled recording time slot by the predefined length of time, a visual indication of a new end time of the scheduled recording time slot.

7. The method of claim 6, further comprising:
detecting a user acceptance of the new end time of the scheduled recording time slot; and
in response to the detecting of the user acceptance of the new end time of the scheduled recording time slot:
modifying the scheduled recording time slot by changing the scheduled end time to the new end time, and
updating the graphical user interface view by
removing the start-time shift option and the end-time shift option from the graphical user interface view, and
replacing the scheduled recording cell with a modified recording cell that represents the modified recording time slot.

8. The method of claim 1, tangibly embodied as computer-executable instructions on at least one non-transitory computer-readable medium.

9. A method comprising:
detecting, on a media content recording device, a media content recording conflict between a plurality of scheduled recordings of media content instances;
providing, for display on a display device in response to the detecting of the media content recording conflict, a graphical user interface view that comprises a plurality of scheduled recording graphical objects that represent scheduled recording time slots for the plurality of scheduled recordings involved in the media content recording conflict;
detecting a user selection of a scheduled recording graphical object included in the plurality of scheduled recording graphical objects, the scheduled recording graphical object representing a scheduled recording time slot for a scheduled recording of a media content instance included in the plurality of scheduled recordings of media content instances, the scheduled recording graphical object positioned within a particular row in the graphical user interface view to visually indicate that the scheduled recording of the media content instance will not be performed because of the media content recording conflict; and
providing, in the graphical user interface view in response to the detecting of the user selection of the scheduled recording graphical object, a user tool for use by a user to provide input to custom define at least one of a new start time and a new end time of the scheduled recording time slot to shorten a length of the scheduled recording time slot;
detecting user input to the user tool to custom define at least one of the new start time and the new end time of the scheduled recording time slot to shorten the length of the scheduled recording time slot;
modifying, in response to the detecting of the user input to the user tool to custom define at least one of the new start time and the new end time of the scheduled recording time slot to shorten the length of the scheduled recording time slot, at least one of a scheduled start time of the scheduled recording time slot to the new start time and a scheduled end time of the scheduled recording time slot to the new end time to shorten the length of the scheduled recording time slot;
detecting that the shortened length of the scheduled recording time slot resolves the media content recording conflict;
removing, in response to the detecting that the shortened length of the scheduled recording time slot resolves the media content recording conflict, the scheduled recording graphical object representing the scheduled recording time slot for the scheduled recording of the media content instance from the particular row in the graphical user interface view; and
adding, in response to the detecting that the shortened length of the scheduled recording time slot resolves the media content recording conflict, a new scheduled recording graphical object representing the shortened scheduled recording time slot for the modified scheduled recording of the media content instance to a different particular row in the graphical user interface view to visually indicate that the modified scheduled recording of the media content instance will be performed.

10. The method of claim 9, wherein the user tool comprises:
a start-time shift option selectable by the user to incrementally shift the scheduled start time of the scheduled recording time slot to a later start time by a predefined length of time, and
an end-time shift option selectable by the user to incrementally shift the scheduled end time of the scheduled recording time slot to an earlier end time by the predefined length of time.

11. The method of claim 10, wherein:
the graphical user interface view includes a time axis; and
the scheduled recording graphical object comprises a scheduled recording cell arranged relative to the time axis to represent the scheduled recording time slot for the scheduled recording of the media content instance.

12. The method of claim 11, wherein:
the detecting of the user selection of at least one of the start-time shift option and the end-time shift option comprises detecting a user selection of the end-time shift option;
the modifying of the at least one of the scheduled start time and the scheduled end time comprises incrementally shifting, in response to the detecting of the user selection of the end-time shift option, the scheduled end time of the scheduled recording time slot by the predefined length of time to shorten the length of the scheduled recording time slot; and
providing, for display within the scheduled recording cell in response to the incrementally shifting of the scheduled end time of the scheduled recording time slot by the predefined length of time, a visual indication of the new end time of the scheduled recording time slot.

13. The method of claim 12, further comprising:
detecting a user acceptance of the new end time of the scheduled recording time slot; and
updating, in response to the detecting of the user acceptance of the new end time of the scheduled recording time slot, the graphical user interface view by
removing the user tool from the graphical user interface view, and
replacing the scheduled recording cell with a modified recording cell that represents a shortened recording time slot that fits within an available recording time slot.

14. The method of claim 9, tangibly embodied as computer-executable instructions on at least one non-transitory computer-readable medium.

15. A system comprising:
a non-transitory data storage facility;
a processor communicatively coupled to the non-transitory data storage facility; and
a media recording facility communicatively coupled to the processor and that directs the processor to
schedule a plurality of recordings of a plurality of media content instances to the data storage facility based on a transmission schedule of the plurality of media content instances,
detect a media content recording conflict between the plurality of scheduled recordings of the media content instances,
provide, for display on a display device in response to the detecting of the media content recording conflict, a graphical user interface view that comprises a plurality of scheduled recording graphical objects that represent scheduled recording time slots for the plurality of scheduled recordings involved in the media content recording conflict,
detect a user selection of a scheduled recording graphical object included in the plurality of scheduled recording graphical objects, the scheduled recording graphical object representing a scheduled recording time slot for a scheduled recording of a media content instance included in the plurality of scheduled recordings of media content instances, the scheduled recording graphical object positioned within a particular row in the graphical user interface view to visually indicate that the scheduled recording of the media content instance will not be performed because of the media content recording conflict, and
provide, in the graphical user interface view in response to the detecting of the user selection of the scheduled recording graphical object, a user tool for use by a user to provide input to custom define at least one of a new start time and a new end time of the scheduled recording time slot to shorten a length of the scheduled recording time slot;
detect user input to the user tool to custom define at least one of the new start time and the new end time of the scheduled recording time slot to shorten the length of the scheduled recording time slot;
modify, in response to the detecting of the user input to the user tool to custom define at least one of the new start time and the new end time of the scheduled recording time slot to shorten the length of the scheduled recording time slot, at least one of a scheduled start time of the scheduled recording time slot to the new start time and a scheduled end time of the scheduled recording time slot to the new end time to shorten the length of the scheduled recording time slot;
detect that the shortened length of the scheduled recording time slot resolves the media content recording conflict;
remove, in response to the detecting that the shortened length of the scheduled recording time slot resolves the media content recording conflict, the scheduled recording graphical object representing the scheduled recording time slot for the scheduled recording of the media content instance from the particular row in the graphical user interface view; and
add, in response to the detecting that the shortened length of the scheduled recording time slot resolves the media content recording conflict, a new scheduled recording graphical object representing the shortened scheduled recording time slot for the modified scheduled recording of the media content instance to a different particular row in the graphical user interface view to visually indicate that the modified scheduled recording of the media content instance will be performed.

16. The system of claim 15, wherein the user tool comprises:
a start-time shift option selectable by the user to incrementally shift the scheduled start time of the scheduled recording time slot to a later start time by a predefined length of time, and
an end-time shift option selectable by the user to incrementally shift the scheduled end time of the scheduled recording time slot to an earlier end time by the predefined length of time.

17. The system of claim 16, wherein the media recording facility further directs the processor to:
detect the user selection of at least one of the start-time shift option and the end-time shift option by detecting a user selection of the end-time shift option; and
modify the at least one of the scheduled start time and the scheduled end time by incrementally shifting, in response to the detecting of the user selection of the end-time shift option, the scheduled end time of the scheduled recording time slot by the predefined length of time.

18. The system of claim 16, wherein the media recording facility further directs the processor to:
detect the user selection of at least one of the start-time shift option and the end-time shift option by detecting a user selection of the start-time shift option; and
modify the at least one of the scheduled start time and the scheduled end time by incrementally shifting, in response to the detecting of the user selection of the start-time shift option, the scheduled start time of the scheduled recording time slot by the predefined length of time.

19. The system of claim 16, wherein:
the graphical user interface view includes a time axis; and
the scheduled recording graphical object comprises a scheduled recording cell arranged relative to the time axis to represent the scheduled recording time slot for the scheduled recording of the media content instance.

20. The system of claim 19, wherein the media recording facility further directs the processor to:
detect the user selection of at least one of the start-time shift option and the end-time shift option by detecting a user selection of the end-time shift option;
modify the at least one of the scheduled start time and the scheduled end time by incrementally shifting, in response to the detecting of the user selection of the end-time shift option, the scheduled end time of the scheduled recording time slot by the predefined length of time to shorten the length of the scheduled recording time slot; and
provide, for display within the scheduled recording cell in response to the incrementally shifting of the scheduled end time of the scheduled recording time slot by the predefined length of time, a visual indication of the new end time of the scheduled recording time slot.

21. The system of claim 20, wherein the media recording facility further directs the processor to:
detect a user acceptance of the new end time of the scheduled recording time slot; and update, in response to the detecting of the user acceptance of the new end time of the scheduled recording time slot, the graphical user interface view by
removing the user tool from the graphical user interface view, and
replacing the scheduled recording cell with a modified recording cell that represents a shortened recording time slot.

\* \* \* \* \*